(12) United States Patent
Tanaka et al.

(10) Patent No.: US 9,162,730 B2
(45) Date of Patent: Oct. 20, 2015

(54) MOTOR DRIVING CONTROL APPARATUS

(75) Inventors: Masato Tanaka, Tokyo (JP); Kazuo Asanuma, Tokyo (JP); Yasuo Hosaka, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 13/996,418

(22) PCT Filed: Dec. 13, 2011

(86) PCT No.: PCT/JP2011/078761
§ 371 (c)(1),
(2), (4) Date: Oct. 15, 2013

(87) PCT Pub. No.: WO2012/086459
PCT Pub. Date: Jun. 28, 2012

(65) Prior Publication Data
US 2014/0039742 A1 Feb. 6, 2014

(30) Foreign Application Priority Data

Dec. 22, 2010 (JP) .................................. 2010-285553
Dec. 22, 2010 (JP) .................................. 2010-285668

(51) Int. Cl.
*B62M 6/45* (2010.01)
*H02P 7/28* (2006.01)
(Continued)

(52) U.S. Cl.
CPC ................ *B62M 6/45* (2013.01); *B60L 11/007* (2013.01); *H02P 6/085* (2013.01); *H02P 7/28* (2013.01); *Y02T 10/642* (2013.01)

(58) Field of Classification Search
CPC ......... B60L 11/007; H02P 6/085; H02P 7/28; B62M 6/45; Y02T 10/642
USPC .......................................................... 701/22
See application file for complete search history.

(56) References Cited

U.S. PATENT DOCUMENTS 5,375,676 A 12/1994 Takata et al.
5,662,187 A 9/1997 McGovern
(Continued)

FOREIGN PATENT DOCUMENTS

EP 0697332 5/1997
JP 63-314018 12/1988
(Continued)

OTHER PUBLICATIONS

International Search Report mailed Jan. 24, 2012 in corresponding International Application No. PCT/JP2011/078761.
(Continued)

*Primary Examiner* — Mary Cheung
*Assistant Examiner* — Anne Mazzara
(74) *Attorney, Agent, or Firm* — Staas & Halsey LLP

(57) ABSTRACT

A motor drive control apparatus for performing motor control that is stable and has a good efficiency includes: a speed processing unit that generates a first value by converting a second value corresponding to a current speed into a duty ratio; a torque processing unit that generates a third value by converting a fourth value corresponding to a target torque into the duty ratio; and a drive unit that controls switching by a switch included in a complementary switching amplifier by an average duty ratio corresponding to a sum of the first value and the third value to drive a motor connected to the complementary switching amplifier.

23 Claims, 19 Drawing Sheets

(51) Int. Cl.
    *B60L 11/00*     (2006.01)
    *H02P 6/08*     (2006.01)

(56) References Cited

U.S. PATENT DOCUMENTS

| | | | |
|---|---|---|---|
| 5,922,035 | A | 7/1999 | Chen |
| 5,937,962 | A | 8/1999 | Yokoyama |
| 5,971,090 | A | 10/1999 | Tanaka et al. |
| 6,580,235 | B2 * | 6/2003 | Laurent ............... 318/400.1 |
| 6,714,849 | B1 | 3/2004 | Ferrero |
| 8,311,623 | B2 | 11/2012 | Sanger |
| 2002/0008489 | A1 * | 1/2002 | Laurent ............... 318/599 |
| 2005/0177285 | A1 | 8/2005 | Honda |
| 2009/0209878 | A1 | 8/2009 | Sanger |
| 2011/0127933 | A1 * | 6/2011 | Shimada et al. ........ 318/139 |

FOREIGN PATENT DOCUMENTS

| | | |
|---|---|---|
| JP | 6-255564 | 9/1994 |
| JP | 8-58668 | 3/1996 |
| JP | 8-80891 | 3/1996 |
| JP | 8-295285 | 11/1996 |
| JP | 9-60547 | 3/1997 |
| JP | 10-59260 | 3/1998 |
| JP | 10-59262 | 3/1998 |
| JP | 10-114292 | 5/1998 |
| JP | 11-79062 | 3/1999 |
| JP | 11-227438 | 8/1999 |
| JP | 11-348867 | 12/1999 |
| JP | 2000-118479 | 4/2000 |
| JP | 3301811 | 4/2002 |
| JP | 3955152 | 5/2007 |
| JP | 2007-282300 | 10/2007 |
| JP | 2008-236906 | 10/2008 |

OTHER PUBLICATIONS

PCT International Preliminary Report on Patentability mailed Jul. 4, 2013 in corresponding International Application No. PCT/JP2011/078761.

PCT International Preliminary Report on Patentability mailed Jul. 11, 2013 in corresponding International Application No. PCT/JP2011/078760.

Extended European Search Report mailed Apr. 3, 2014 in corresponding European Patent Application No. 11851554.3.

U.S. Office Action dated Dec. 18, 2014 in co-pending U.S. Appl. No. 13/995,769.

\* cited by examiner

—— CURRENT DIRECTION DURING POWER RUNNING
--- CURRENT DIRECTION DURING BATTERY REGENERATION

MOTOR DRIVING CONTROL APPARATUS

CROSS-REFERENCE TO RELATED APPLICATIONS

This application is a U.S. national stage application of PCT/JP2011/078761 filed Dec. 13, 2011 and claims foreign priority benefit of Japanese Application No. 2010-285553 filed Dec. 22, 2010 and Japanese Application No. 2010-285668 filed Dec. 22, 2010 in the Japanese Intellectual Property Office, the contents of both of which are incorporated herein by reference.

TECHNICAL FIELD

The present invention relates to motor driving control.

BACKGROUND TECHNOLOGY

FIG. 1 is a diagram illustrating a description of basic operation for a motor driving. The motor driving state is controlled by control of a duty ratio from switching between FET or other switches S1 through S4, which includes this kind of an H bridge circuit. For example, when a large voltage Vout by a counter-electromotive force Vmotor generated by motor rotations is supplied from a battery batt, the motor is in a power running state. When controlling the duty ratio of the switches with PWM (Pulse Width Modulation), and for example the period when the switches S1 through S4 are on is lengthened, then when Vout=Vbatt*Duty (on ratio)>Vmotor, this achieves the power running state (state where torque output is present) for example. When in a power running state, current flows to the motor side, as indicated by the solid arrow in FIG. 1. Also, by adjusting the period when the switches S1 through S4 are on, it is possible to create a state where Vout=Vmotor (torque zero state). Further, by shortening the period when the switches S1 and S4 are on, a state in which Vout<Vmotor is created, and thus there a transition to a battery regeneration state where current flows to the battery batt as illustrated by the dotted arrow in FIG. 1 if the battery batt is a storage battery. Additionally, by adjusting the switching duty ratio of switches S1 through S4, other braking states may be enabled such as a loss brake state that discards the counter-electromotive force Vmotor from the motor.

Further, just as electric power is supplied to the motor in a normal rotation from the switches S1 and S2; of course this may be driven by electric power supplied to the motor from the switches S3 and S4 in an inversed direction.

Technologies to drive motors with a battery such as (1) a diode driving method and (2) a current constant feedback method are well known.

(1) Diode Driving Method

This technology uses a parasitic FET diode or a specialized diode in an H bridge circuit such as illustrated in FIG. 1, and supplies a PWM duty ratio to only the power running direction or the braking direction to apply torque by a broad feed forward. There is no concern for open loop problems, and is well known for its ability to readily and reliably control the power running or the braking direction.

However, efficiency is sacrificed due the drop voltage of the diode. Also, the rectifying action of the diode causes current to flow only in the instant the applied voltage is more than the counter-electromotive force for when power running, and to flow only in the instant the applied voltage is less than the counter-electromotive force for the braking periods. Because the counter-electromotive force is in proportion to the sinusoidal voltage output when compared to the motor rotation speed, the applied voltage is not proportional to the current and therefore also the torque, this causes a problem in which the linearity of torque control greatly worsens, and this linearity is also largely affected by the speed. For this reason, in order to obtain the target torque, an extremely complicated correction control regarding the speed and target torque is necessary.

(2) Current Constant Feedback Method

This method detects motor current in real time, and control the motor current depending on the desired torque supplying a constant feedback regardless of speed at that time.

Although accuracy is high due to a control that monitors the current, which is the control result, the disadvantage is that negative return control can easily cause instability, and so to create a stable feedback control, a control which is a sufficiently low cut-off frequency is requested regarding a loop response (motor current detection→microcomputer calculation→output instruction), which slows the response making it necessary to further increase the speed and accuracy of the loop response. Also, if there is a break up in the information indicating where the return should occur, this could cause a problem where the control amount is determined to be insufficient, and so excessive response attempts are made.

Further, Japanese Unexamined Patent Application Publication No. 10-59262 proposes a method to perform feedback through a proportional circuit and an integrator to determine the deviation between an assist torque instruction (input) and the motor torque (output). Generally, this is called PI control or phase lag correction.

In the case of this control system, the integrator causes phase lag in the high-frequency region, and so there is a possibility that a lag element in the motor, which is the control object, causes oscillation. For this reason, differential circuit is often added to advance the phase at this high-frequency region. However, when complicating the control system in this way, it is necessary to model the inverter and motor that are the control subjects, which may cause a change in properties due to modeling errors or variance and degradation of devices developed from models without errors and therefore possibly cause oscillation.

PRIOR TECHNICAL DOCUMENTS

Patent Documents

Patent Document 1: Japanese Laid-open Patent Publication No. 10-59262

SUMMARY OF THE INVENTION

Object to be Solved by the Invention

Regarding the above, an object of the present invention is to provide a motor control technology that is efficient and stable.

Means for Solving the Problem

A motor drive control apparatus relating to a first mode of the present invention is an apparatus according to a so-called speed-tracking and torque-feed-forward method (hereafter, abbreviated to torque feed-forward), and has (A) a speed processing unit that generates a first value by converting a second value corresponding to a current speed into a duty ratio; (B) a torque processing unit that generates a third value by converting a fourth value corresponding to a target torque into a duty ratio; and (C) a drive unit that controls switching by a switch included in a complementary switching amplifier by an average duty ratio corresponding to a sum of the first value and the third value to drive a motor connected to the complementary switching amplifier.

With such a calculation, it is possible to perform torque feed-forward addition of the target torque while being balanced with a voltage that is caused by the counter-electromotive force corresponding to the current speed without using any diode, and accordingly it is possible to stably perform efficient motor driving. Note that the first and second values respectively may be positive or negative values.

Also, the motor drive control apparatus relating to the first mode may further include a calibrating unit that calibrates the fourth value so as to reduce a drive current of the motor according to a deviation of a fifth value that is obtained by converting a sixth value corresponding to the drive current into toque, when the fifth value deviates from the fourth value by a predetermined permissible amount or more. Thus, this motor drive control apparatus is secure, because the fourth value (i.e. the target torque) is calibrated to reduce the drive current of the motor even in such cases where the drive current of the motor is increasing for some reason, or is detected to be increasing.

Also, the motor drive control apparatus relating to the first mode may further include an advance correction unit that generates a signal for phase control of a signal for the switching from the second value and the fourth value. It is preferable to perform the a timing correction while considering into account the second value corresponding to the current speed in order to output a suitable torque corresponding to the target torque to the motor.

Further, the drive unit in the motor drive control apparatus relating to the first mode may correct a sum of the first value and the third value according to a power supply voltage. This is because the power supply voltage changes depending on a degree of battery drain.

Also, the torque processing unit in the motor drive control apparatus relating to the first mode may correct the fourth value according to the second value. For example, plural types of correction curves are prepared depending on the current speed in advance, and then a curve that increases the fourth value may be employed when the current speed is fast.

Further, the torque processing unit in the motor drive control apparatus relating to the first mode may include a torque restriction unit that puts restrictions on a range of the fourth value based on a current restriction corresponding to a current duty ratio and a power supply voltage. Thus, in the torque feed-forward control, it is possible to restrict the fourth value according to the current restriction that is restriction for the power supply, so that a suitable current flows to the motor.

Further, when the power supply described previously is a rechargeable battery, the current restriction corresponding to the power supply voltage may be set according to the full charge surplus or remaining charge surplus of the rechargeable battery. As a result, the rechargeable battery can be protected by preventing from overdischarging and overcharging. Further, the aforementioned torque restriction unit may put restrictions on the range of the fourth value further based on a current restriction that is based on a temperature of the switch. As a result, the switches are protected.

Further, the motor drive control apparatus relating to the first mode may further include a speed prediction unit that predicts the aforementioned current speed from plural past speed detection results. Thus, it is possible to obtain an accurate current speed, and accordingly it is possible to implement a suitable torque feed-forward control.

Also, the aforementioned torque processing unit may identify a corresponding fourth value from a current second value according to a predetermined correspondence between the second value and the corresponding fourth value in response to a brake instruction. In such a case, according to the aforementioned correspondence, the fourth value is a value opposite in polarity to the second value. The torque is adjusted to a suitable torque corresponding to the current speed during the braking.

Further, the aforementioned correspondence may be a correspondence by which the fourth value becomes a value that is opposite in polarity to the second value and equal to or less than an absolute value of the second value ("being equal to or less than a half" includes a case of "exceeding a half" by a few percentage, for example). Thus, it becomes possible to perform a reasonably efficient regeneration at any speed.

Also, the aforementioned brake instruction may also include an instruction concerning a brake amount. In such a case, the aforementioned correspondence may include different correspondences depending on the brake amount. Thus, it is possible to perform a highly efficient regeneration depending on the brake amount.

Further, the aforementioned correspondence may include a portion in which, as an absolute value of the second value becomes greater, an absolute value of the fourth value becomes lesser. Various curves may be set, however, the efficiency of the regeneration is enhanced by restricting brake torque when the speed is high.

Further, the aforementioned correspondence may include a portion of a correspondence determined by current restriction determined according to a power supply voltage. As for the brake, when regenerating the rechargeable battery, a current restriction is also set according to the battery state.

Further, the motor drive control apparatus relating to the first mode may further include a second calibrating unit that calibrates a duty ratio conversion coefficient or a duty ratio conversion function in the speed processing unit so that a drive current of the motor becomes zero when the fourth value is zero. An error of the current detection and/or gain can be cancelled, and so it becomes possible to perform a suitable torque feed-forward control.

Further, the aforementioned second calibrating unit may calibrate the duty ratio conversion coefficient or the duty ratio conversion function in the speed processing unit so that a difference between a drive current value during stop of motor drive and a drive current value during non-stop of the motor drive becomes zero when a state is detected in which the fourth value is zero. According to this, it is possible to more accurately calibrate the coefficient or function.

Also, when the aforementioned current vehicle speed is the vehicle speed regarding a motor-driven wheel, the motor drive control apparatus relating to the first mode may further include a vehicle speed estimation unit that estimates a vehicle speed regarding a pedal-driven wheel from a rotation frequency of a pedal, wherein the current speed is a vehicle speed regarding a motor-driven wheel; a comparator that compares the current speed with the vehicle speed regarding the pedal-driven wheel; and
a control signal output unit that outputs a control signal for suppressing motor drive when the comparison result from the comparator represents that the current speed is faster than the vehicle speed regarding the pedal-driven wheel, and an input torque from the pedal is equal to or greater than a threshold. Also, when focused on the pedal driven-wheel, the motor drive control apparatus relating to the first mode may further a vehicle speed estimation unit that estimates a vehicle speed regarding a pedal-driven wheel from a rotation frequency of a pedal-driven wheel, wherein the current speed is a vehicle speed regarding a motor-driven wheel; a comparator that compares the current vehicle speed with the vehicle speed regarding the pedal-driven wheel; and a control signal output unit that outputs a control signal for suppressing motor drive when the comparison result from the comparator represents that the current speed is faster than the vehicle speed regarding the pedal-driven wheel. Thus, it becomes possible to detect the slip of the motor-driven wheel, and accordingly, it is possible to suppress the slip.

Further, the motor drive control apparatus relating to the first mode may further include a circuit that sets the aforementioned target torque to zero (this may include a case of almost being zero and cases where the value is sufficiently lesser than the original value, such as 1/10) by the aforementioned control signal. Thus, the third value becomes zero, and the motor driving is suppressed.

Also, the motor drive control apparatus relating to the first mode may further include a circuit that causes the speed processing unit to process the vehicle speed regarding the pedal-driven wheel estimated by the vehicle speed estimating unit instead of the current speed.

The vehicle speed regarding the pedal-driven wheel is nearly zero, then the aforementioned second value becomes nearly zero, and then the aforementioned first value becomes nearly zero, and so the motor drive is suppressed.

Further, the aforementioned vehicle speed estimating unit may estimate the vehicle speed regarding the pedal-driven wheel based on a product of the rotation frequency of the pedal, the circumference of the pedal-driven wheel, and a gear ratio of a transmission. As for the gear ratio, it may be unknown, so in such a case, the maximum gear ratio is used. Also, various margins may be incorporated.

Also, the motor drive control apparatus relating to the first mode may further include a circuit that calculates an indicator value for determining whether or not slip of the motor-driven wheel occurs, by using the current speed, a rotation frequency of a pedal and a circumference of a pedal-driven wheel, and determines whether or not the slip of the motor-driven wheel occurs, based on the indicator value when an input torque by the pedal is equal to or greater than a threshold; and a control signal output unit that outputs a control signal for suppressing motor drive when it was determined that the slip of the motor-driven wheel occurred. As will be described later, various indicator values may be used, which is obtained from the current speed>(the rotation frequency of the pedal*the circumference length of the pedal-driven wheel*the gear ratio (which could be a value "1")), for example.

Also, the motor drive control apparatus relating to the second mode has (A) a speed processing unit that generates a first value by converting a second value corresponding to a current speed into a duty ratio; (B) a torque processing unit that generates a third value by converting a fourth value corresponding to a target torque into the duty ratio; (C) a drive unit that controls switching by a switch included in a complementary switching amplifier by an average duty ratio corresponding to a sum of the first value and the third value to drive a motor connected to the complementary switching amplifier; and (D) a calibrating unit that calibrates a second duty ratio conversion coefficient in the torque processing unit based on a reference value of a first duty ratio conversion coefficient in the speed processing unit, a value of the first duty ratio conversion coefficient, which is calibrated so that a motor drive current becomes zero when the fourth value is zero, and a reference value of the second duty ratio conversion coefficient. As a result, the torque processing unit can perform a processing using a suitably calibrated coefficient value.

Further, a program may be created, which executes the aforementioned processing using a microprocessor, and the program is stored on a computer-readable recording medium or recording device such as, for example, a flexible disk, an optical disc such as a CD-ROM, a magneto-optical disc, semiconductor memory (ROM for example), or a hard disk. Further, the data during the processing may be temporarily held in a storage device such as RAM (Random Access Memory) or similar.

BRIEF DESCRIPTION OF THE DRAWINGS

FIG. 1 is a diagram describing basic operation of a motor drive;

FIG. 2 is a functional block diagram of a motor drive control device related to a first Embodiment;

FIG. 3 is a functional block diagram of the motor drive control device related to the first Embodiment;

FIG. 4 is a diagram describing issues related to a second Embodiment;

FIG. 5 is a diagram describing issues related to the second Embodiment;

FIG. 6 is a diagram describing issues related to the second Embodiment;

FIG. 7 is a functional block diagram of the motor drive control device related to the second Embodiment;

FIG. 8 is a diagram illustrating an example of an electrically assisted bicycle related to a third Embodiment;

FIG. 9 is a functional block diagram associated with a motor drive control instrument related to the third Embodiment;

FIG. 11 is a functional block diagram of a calculating unit related to the third Embodiment;

FIG. 12 is a first functional block diagram of a vehicle speed input unit;

FIG. 13 is a second functional block diagram of the vehicle speed input unit;

FIG. 14 is a first functional block diagram of an advance correction unit;

FIG. 15 is a second functional block diagram of the advance correction unit;

FIG. 16 is a diagram illustrating an example of a torque correction function;

FIG. 17 is a functional block diagram of a current restriction unit;

FIG. 18 is a diagram illustrating an example of a battery derating curve;

FIG. 19 is a diagram illustrating an example of a FET temperature and current restriction value function;

FIG. 20 is a diagram describing the correction of a coefficient for converting a duty cycle form the vehicle speed;

FIG. 21 is a first functional block diagram of a speed coefficient calibrating unit;

FIG. 22 is a second functional block diagram of the speed coefficient calibrating unit;

FIG. 23 is a diagram describing a target torque calculating unit for regenerative braking;

FIG. 24 is a diagram describing the target torque calculating unit for regenerative braking;

FIG. 25 is a diagram describing the target torque calculating unit for regenerative braking;

FIG. 26 is a diagram describing the target torque calculating unit for regenerative braking;

FIG. 27 is a functional block diagram of the target torque calculating unit for regenerative braking;

FIG. 28 is a first functional block diagram of a correction unit of the duty cycle coefficient against the torque;

FIG. 29 is a second functional block diagram of the correction unit of the duty cycle coefficient against the torque;

FIG. 30 is a functional block diagram of a calculating unit and such related to a fourth Embodiment; and

FIG. 31 is a functional block diagram of the calculating unit and such related to a modification of the fourth Embodiment.

MODE FOR CARRYING OUT THE INVENTION

[First Embodiment]

Figure 1:
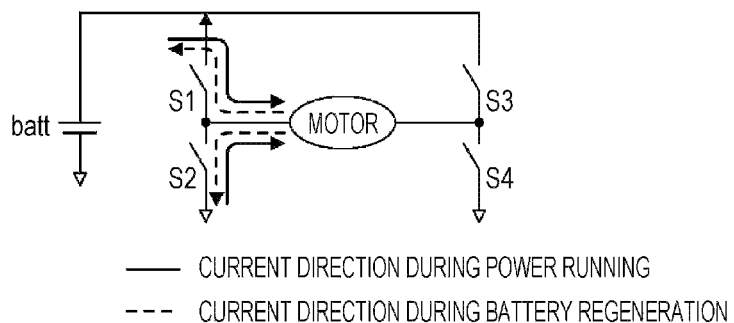
[FIG. 1]
Figure 2:
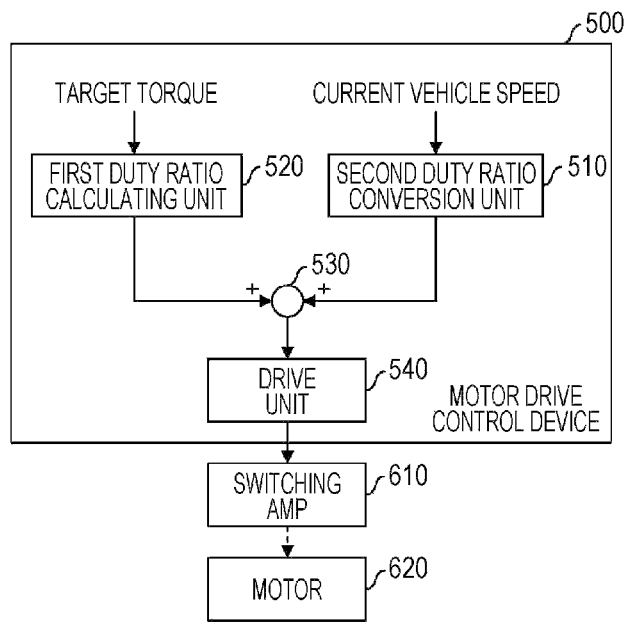
[FIG. 2]

FIG. 2 is a functional block diagram of a motor drive control device 500 related to the present embodiment. The motor drive control device 500 includes a first duty cycle conversion unit 520, a second duty cycle conversion unit 510, an adding unit 530, and a drive unit 540. The output of the drive unit 540 of the motor drive control device 500 is connected to a complementary type switching amplifier 610, and a motor 620 is driven by this switching amplifier 610.

For example, a first digital value corresponding to the current speed from a sensor connected to the applicable the motor drive control device 500 and a third digital value corresponding to a target torque from an instruction mechanism or sensor connected to the motor drive control device 500 is input into the motor drive control device 500, and so processing is performed there. Also, the second duty cycle conversion unit 510 executes processing to multiply the conversion coefficient with the first digital value (coefficient derived from dividing the duty cycle by the current speed), and outputs the second digital value by converting the first digital value into a duty cycle. Similarly, the first duty cycle conversion unit 520 executes processing to multiply the conversion coefficient with the third digital value (coefficient derived from dividing the duty cycle by the torque), and outputs the fourth digital value by converting the third digital value into a duty cycle.

The adding unit 530 adds the second digital value from the second duty cycle conversion unit 510 and the fourth digital value from the first duty cycle conversion unit 520, and outputs this to the driving unit 540. The driving unit 540 performs switching of the switches in the switching amplifier 610 to obtain an average duty cycle corresponding to the sum of the second and the fourth digital values. This switching may be performed using the PWM method, PNM (Pulse Number Modulation) method, the PDM (Pulse Density Modulation) method, or some other one-bit amplification method.

In this way, the motor 620 is driven by the voltage or current corresponding to the average duty cycle.

Figure 3:
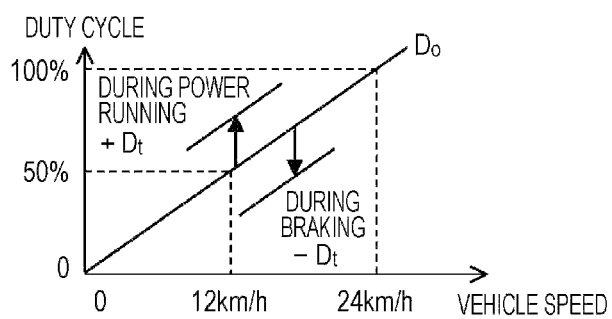
[FIG. 3]

This kind of motor drive control device 500 will be further described using FIG. 3. Here, the second digital value is represented as $D_0$, and the fourth digital value is represented as $D_T$. Thus, as previously described, the average duty cycle Duty from the switches of the switching amplifier 610 is expressed as Duty=$D_0$+$D_T$.

According to the present embodiment, the average duty cycle Duty changes according to the straight line $D_0$ as long as the current speed remains constant. When the state is such that power is flowing to the motor 620 for acceleration, a positive value, +$D_t$ for example, is set to shift the target torque above this solid line for the $D_t$ portion. In this way, only the target torque is accelerated, but the average duty cycle also relatively increases. In contrast, when decelerating by setting the motor 620 to a braking state, a negative value, -$D_t$ for example, is set for the target torque, so this straight line is shifted downwards by an amount equivalent to $D_t$. In this way, only the target torque is decelerated, and the average duty cycle also relatively decreases.

Further, there are cases where the second digital value $D_0$, which is equivalent to the current speed, may be set to a positive value or a negative value corresponding to the either normal rotation or inverse rotation of the motor 620.

By executing the previously described torque and feed forward control, a stable control may be performed also without the loss of efficiency as with diode drive methods, which is preferably used in an electrically assisted bicycle, for example. However, this may also be used in other motor drives as well.

[Second Embodiment]

Regarding the first Embodiment, there is no problem when obtaining the output torque corresponding to the target torque, but current flowing to the motor could increase due to variances in components and such, and as a result, this can cause a torque larger than the target torque to be produced.

Figure 4:
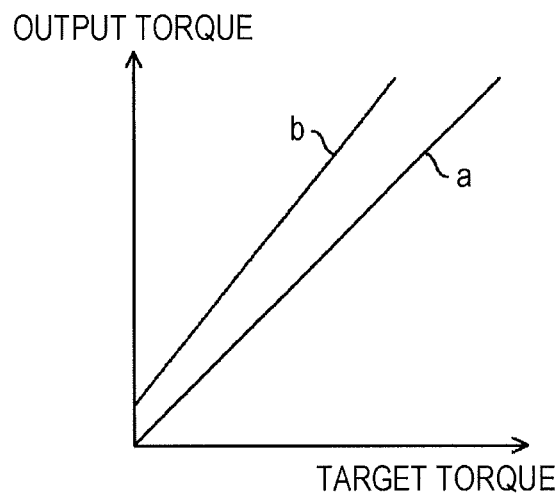
[FIG. 4]
Figure 5:
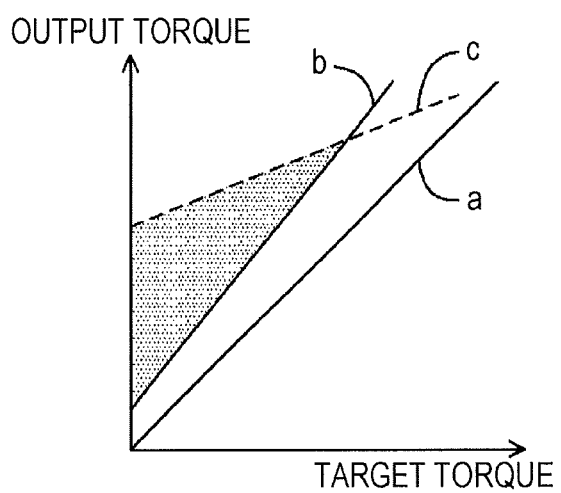
[FIG. 5]

As illustrated in FIG. 4, it is generally preferable if the output torque corresponding to the target torque matches as illustrated by the straight line a. Also, for safety reasons, the output torque should be set corresponding to the target torque, and also should be set to a value in the region below the upper limit of the allowable amount as illustrated by the straight line b. However, as indicated by the dotted line c illustrated in FIG. 5, if the current flowing to the motor is increased for some reason, a larger current than that corresponding to the target torque flows, and as a result, there may be cases in which an output torque in a region (shaded area) over the upper limit of the allowable amount as illustrated by the straight line b is requested, and so drives the motor.

Figure 6:
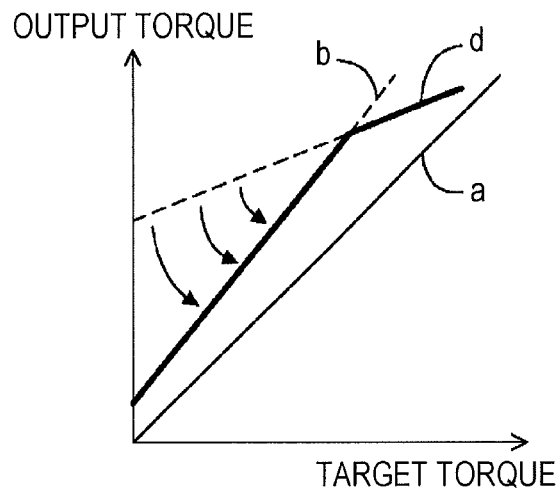
[FIG. 6]

According to the present embodiment, a configuration that avoids this kind of situation is employed. As illustrated schematically in FIG. 6, output torque values corresponding to the target torque that are over the upper limit of the allowable amount (values over the straight line b) are forcibly modified, for example, and an output torque after modification as illustrated by the heavy line d is obtained to drive the motor.

Figure 7:
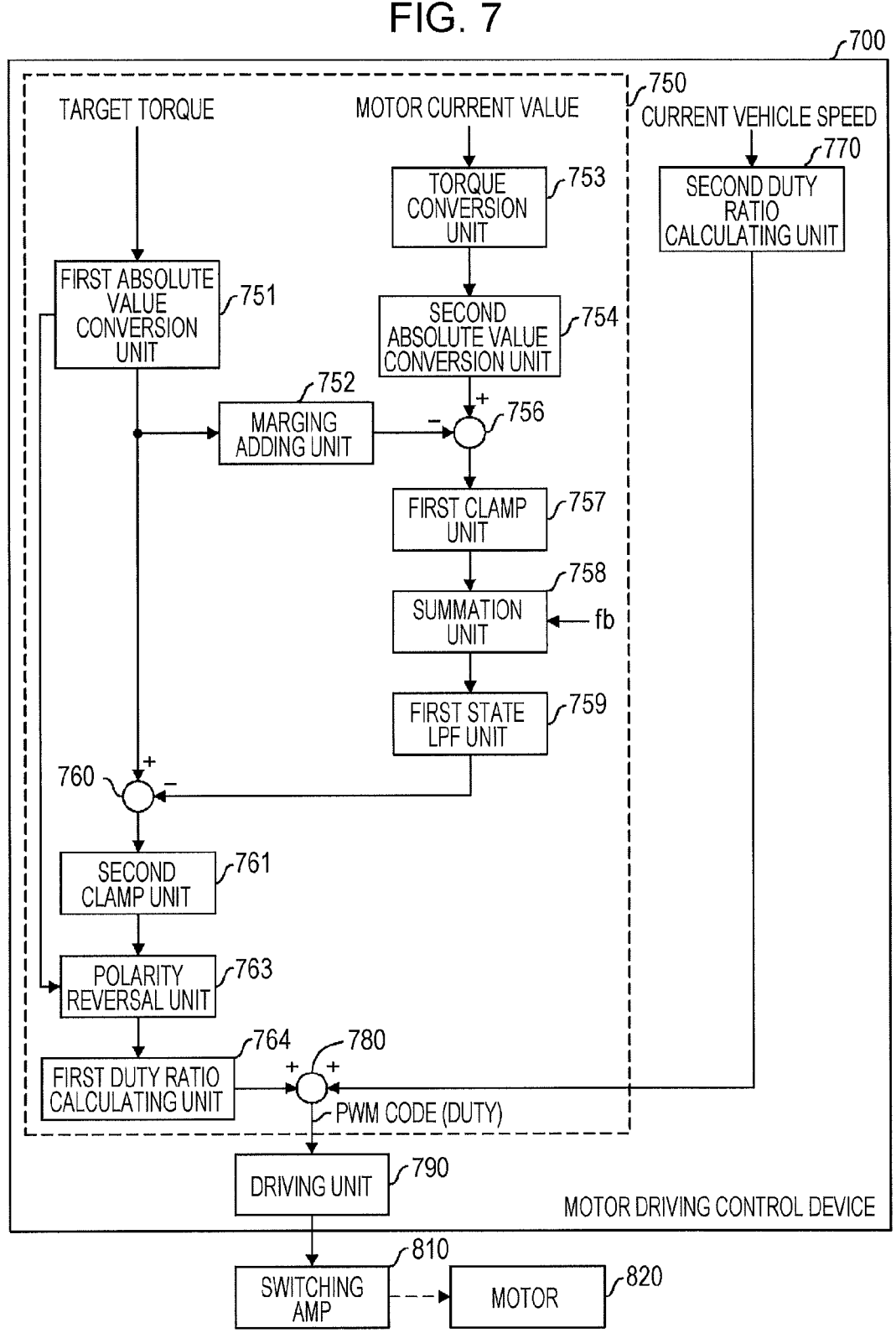
[FIG. 7]

Specifically, a motor drive control device 700 as illustrated in FIG. 7 is employed. The motor drive control device 700 related to the second embodiment includes a torque processing unit 750, a second duty cycle conversion unit 770, an adding unit 780, and a drive unit 790.

The torque processing unit 750 includes a first absolute value conversion unit 751, a margin adding unit 752, a torque conversion unit 753, a second absolute value conversion unit 754, an adding unit 756, a first clamp unit 757, a summation unit 758, a first LPF (Low Pass Filter) unit 759, an adding unit 760, a second clamp unit 761, a polarity reversal unit 763, and a first duty cycle conversion unit 764. The drive unit 790 of the motor drive control device 700 is connected to a complementary type switching amplifier 810. Also, the motor 820 is driven by the switching amplifier 810.

The second duty cycle conversion unit 770 executes processing to multiply the conversion coefficient with the first digital value (coefficient derived from dividing the duty cycle by the current speed) corresponding to the current speed from a sensor connected to the motor drive control device 700, and outputs the second digital value by converting the first digital value into a duty cycle.

The first absolute value conversion unit 751 of the torque processing unit 750 extracts a sign from the third digital value corresponding to the target torque taken from an instruction mechanism or sensor connected to the motor drive control device 700, outputs this to the polarity reversal unit 763, and outputs a numerical portion (|the third digital value|=Tc) to the margin adding unit 752 and the adding unit 760.

Also, the torque conversion unit 753 executes processing to multiply the conversion coefficient (coefficient derived by dividing the torque by the motor drive current value) with a fifth digital value corresponding to the motor drive current that flows to the motor 820, and outputs a sixth digital value by converting the fifth digital value into a duty cycle. The second absolute value conversion unit 754 removes the sign from the sixth digital value, and outputs the numerical portion (|the sixth digital value|).

The margin adding unit 752 adds a margin corresponding to the |the third digital value| using an expression, for example, such as Tm=Tc*1.15+a predetermined number α. Also, the adding unit 756 adds the |the sixth digital value|, which is the output from the second absolute value conversion unit 754 with the −Tm value. When this addition result is negative, that is to say, when the Tm value is larger than the |the sixth digital value|, the target torque may be output as it is without any problem, and so the first clamp unit 757 outputs a zero. In contrast, when the Tm value is smaller than the |the sixth digital value|, the addition result is a positive value, and the first clamp unit 757 outputs the addition result as it is to the summation unit 758 to correct the target torque. The summation unit 758 multiplies a current correction following time constant FB to the calculation result, and then outputs this. Also, a first state LPF unit 759 executes a first state low pass filter smoothing processing on the output of the summation unit 758, and outputs this. In this way, a corrected amount based on the motor current value is calculated.

Also, the adding unit 760 subtracts (adds a negative correction amount) the output of the first stage LPF unit 759 from the |the third digital signal|, which is the output of the first absolute value conversion unit 751, and outputs this. The second clamp unit 761 outputs a zero when the result output from the adding unit 760 is a negative value, that is to say, when the correction amount is larger, and outputs the result output form the adding unit 760 as it is when the value is positive. Also, the polarity reversal unit 763 inverses the polarity of the output from the second clamp unit 761 when the target torque is a negative value, and a signal is received representing that the sign from the first absolute value conversion unit 751 is negative, outputs this, and when a signal is received representing that the sign is a positive value, this is output as it is without any processing. In this way, the third digital value is output to the first duty cycle conversion unit 764 after a correction corresponding to the motor current value has been performed.

The first duty cycle conversion unit 764 multiplies the conversion coefficient (coefficient derived by dividing the duty cycle by the torque) with the third digital value after correction, and outputs the fourth digital value by converting the third digital value after correction into a duty cycle.

The adding unit 780 adds the second digital value from the second duty cycle conversion unit 770 and the fourth digital value from the first duty cycle conversion unit 764, and outputs this to the drive unit 790. The drive unit 790 performs switching of the switches in the switching amplifier 810 to obtain an average duty cycle corresponding to the sum of the second and the fourth digital value. This switching may be performed using the PWM method, PNM (Pulse Number Modulation) method, the PDM (Pulse Density Modulation) method, or some other one-bit amplification method.

In this way, the motor 820 is driven by the current and voltage corresponding to the average duty cycle.

In this way, by implementing a torque and feed forward control, a save motor drive may be performed even when too much motor current is flowing causing a potential overdrive state by performing an operation to lower the target torque. Further, as a calculation is performed to convert to absolute values, it is assumed that the target torque value and motor current value, which is the conversion of the torque, may be negative values.

Further, the advantages as described for the first Embodiment may also be obtained.

[Third Embodiment]

The third Embodiment of the present invention will be described using FIG. 8 through FIG. 27. Here, this will be described using an example of a so-called electrically assisted bicycle in which the motor is installed on a bicycle.

Figure 8:
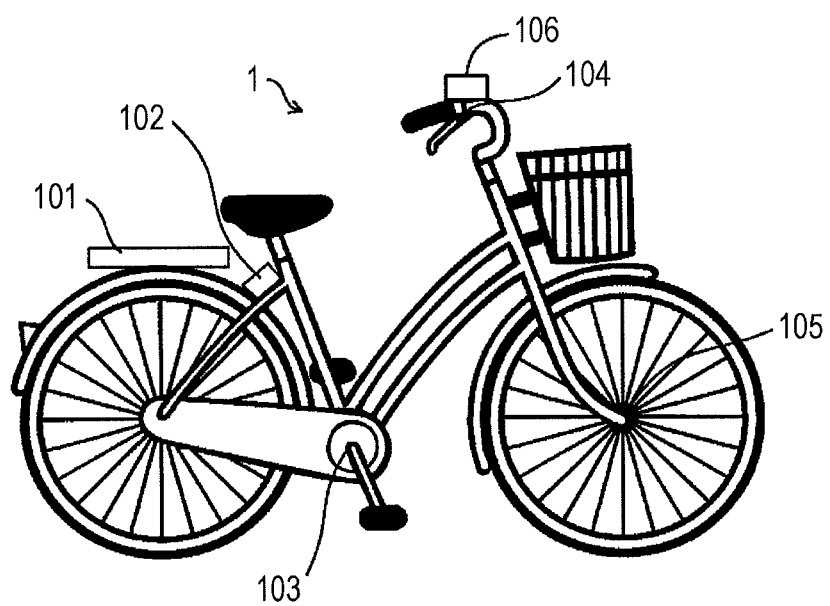
[FIG. 8]

FIG. 8 is an external view illustrating an example of an electrically assisted bicycle related to the third Embodiment. The electrically assisted bicycle 1 is typical rear wheel drive type with a crankshaft and a rear wheel connected by a chain, and has a motor drive device installed. The motor drive device includes a secondary battery 101, a motor drive control mechanism 102, a torque sensor 103, a brake sensor 104, a motor 105, and an operation panel 106.

The secondary battery 101 may be, for example, a lithium ion secondary battery with a maximum supply voltage of 24 V (when fully charged), but other types of batteries such as a lithium ion polymer secondary battery, or a nickel hydride chargeable battery may be used.

The torque sensor 103 is provisioned on the wheel which is installed on the crankshaft, detects pedal force from the rider, and this detection result is output to the motor drive control mechanism 102.

The brake sensor 104 is configured from a magnet and a common lead switch. The magnet is fixed to a brake wire connected to a brake lever in housing to which the brake lever is fixed and the brake wire transmits. The brake lever changes the lead switch to an on state when gripped by hand. Also, the lead switch is fixed to the housing. A conduction signal from this lead switch is sent to the motor drive control mechanism 102.

The motor 105 is, for example, a common three-phase direct current brushless motor, and mounted on the front wheel of the electrically assisted bicycle 1. The motor 105 rotates the front wheel, and also a rotor is connected to the front so as to rotate corresponding to the rotation of the front wheel. Further, the motor 105 is equipped with a hall effect sensor to output rotation information of the rotor (i.e. a hall signal) to the motor drive control mechanism 102.

The operation panel 106 receives instruction input related to the presence of assist, and outputs the applicable instruction input to the motor drive control mechanism 102. Further, the operation panel 106 may receive assist ratio setting input from the user, and output the applicable setting input to the motor drive control mechanism 102.

Figure 9:
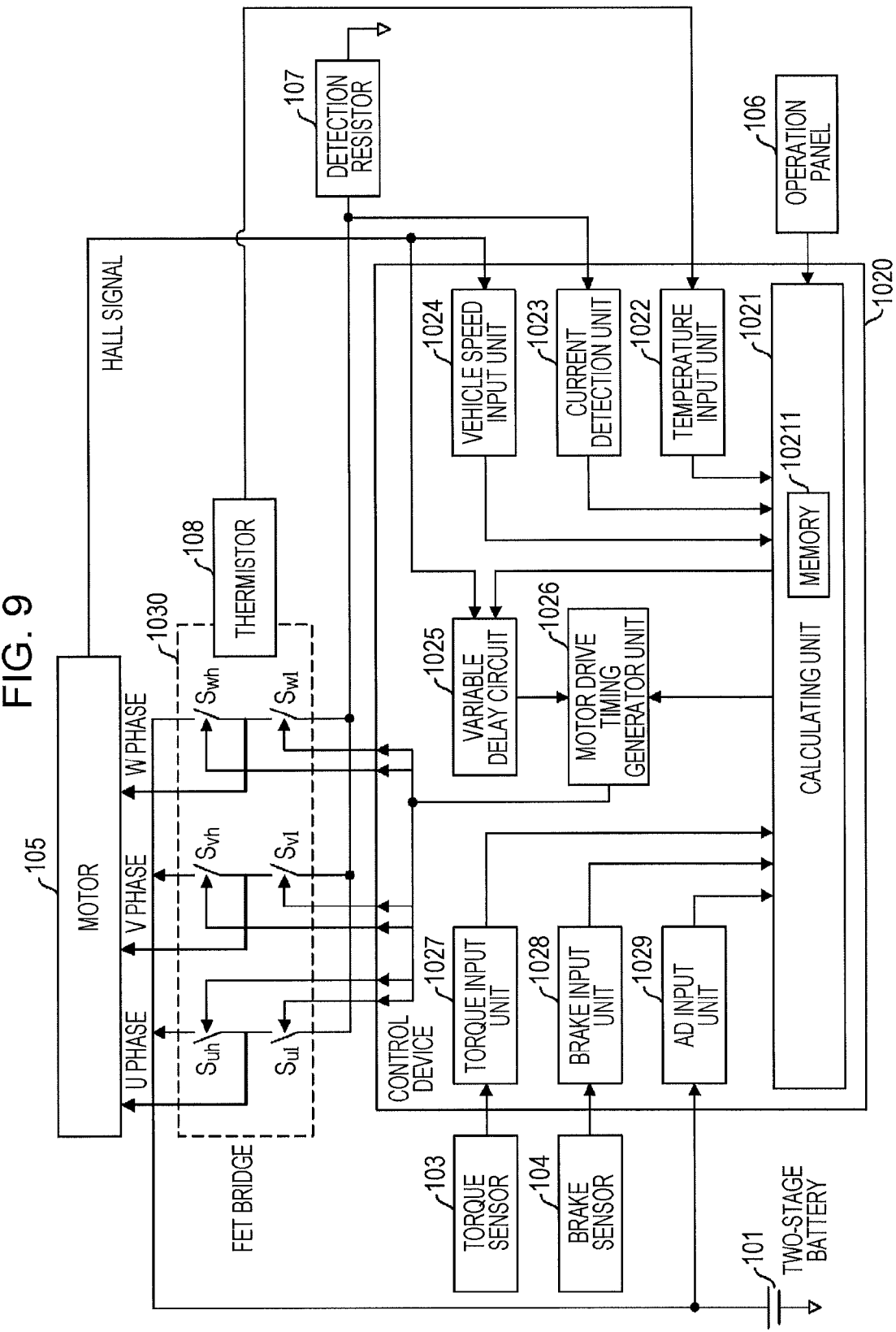
[FIG. 9]

FIG. 9 illustrates a configuration related to the motor drive control mechanism 102 of this kind of electrically assisted bicycle 1. The motor drive control mechanism 102 includes a control mechanism 1020, and a FET (Field Effect Transistor) bridge 1030. The FET bridge 1030 includes a high side FET ($S_{uh}$) and a low side FET ($S_{ul}$) to perform switching of a U phase of the motor 105, a high side FET ($S_{vh}$) and a low side FET ($S_{vl}$) to perform switching of a V phase of the motor 105, and a high side FET ($S_{wh}$) and a low side FET ($S_{wl}$) to perform switching of a W phase of the motor 105. This FET bridge 1030 is configured as a portion of the complementary type switching amplifier. Also, a thermistor 108 for measuring temperature is provisioned in the FET bridge 1030.

Also, the control mechanism 1020 includes a calculating unit 1021, a temperature input unit 1022, a current detection unit 1023, a vehicle speed input unit 1024, a variable delay circuit 1025, a motor drive timing generator 1026, a torque input unit 1027, a brake input unit 1028, and an AD input unit 1029.

The calculating unit 1021 performs calculations described later using input from the operation panel 106 (i.e. on/off or operation mode such as an assist ratio), input from the temperature input unit 1022, input from the current detection unit 1023, input from the vehicle speed input unit 1024, input from the torque input unit 1027, input from the brake input unit 1028, and input from the AD input unit 1029, and performs an output to the motor drive timing generator unit 1026 and the variable delay circuit 1025. Further, the calculating unit 1021 includes a memory 10211, and the memory 10211 stores various data used in calculations, data currently in processing, and other data. Further, the calculating unit 1021 may be realized by executing a program with a processor, and in this case the applicable program may be stored in the memory 10211.

The temperature input unit 1022 digitizes the input from the thermistor 108, and outputs this to the calculating unit 1021. The current detection unit 1023 digitizes voltage values corresponding to current via a detection resistor 107 that detects current flowing to the FETs in the FET bridge 1030, and outputs this to the calculating unit 1021. The vehicle input unit 1024 calculates the current speed from the hall signal output by the motor 105, and outputs this to the calculating unit 1021. The torque input unit 1027 digitizes the signal equivalent to the pedal effort from the torque sensor 103, and outputs this to the calculating unit 1021. The brake input unit 1028 digitizes the signal equivalent to the brake input from the brake sensor 104, and outputs this to the calculating unit 1021. The AD (Analog-Digital) input unit 1029 digitizes the output voltage from the secondary battery 101, and outputs this to the calculating unit 1021. Also, the memory 10211 may be provisioned separately from the calculating unit 1021.

The calculating unit 1021 outputs an advance value, which is the calculating result, to the variable delay circuit 1025. The variable delay circuit 1025 adjusts the phase of the hall signal based on the advance value received from the calculating unit 1021, and outputs this to the motor drive timing generator unit 1026. The calculating unit 1021 outputs a PWM code equivalent to the PWM duty cycle, for example, to the motor drive timing generator unit 1026. The motor drive timing generator unit 1026 generates switching signals and outputs these to each FET included in the FET bridge 1030, based on the hall signal after adjustment from the variable delay circuit 1025 and the PWM code from the calculating unit 1021.

Figure 10:
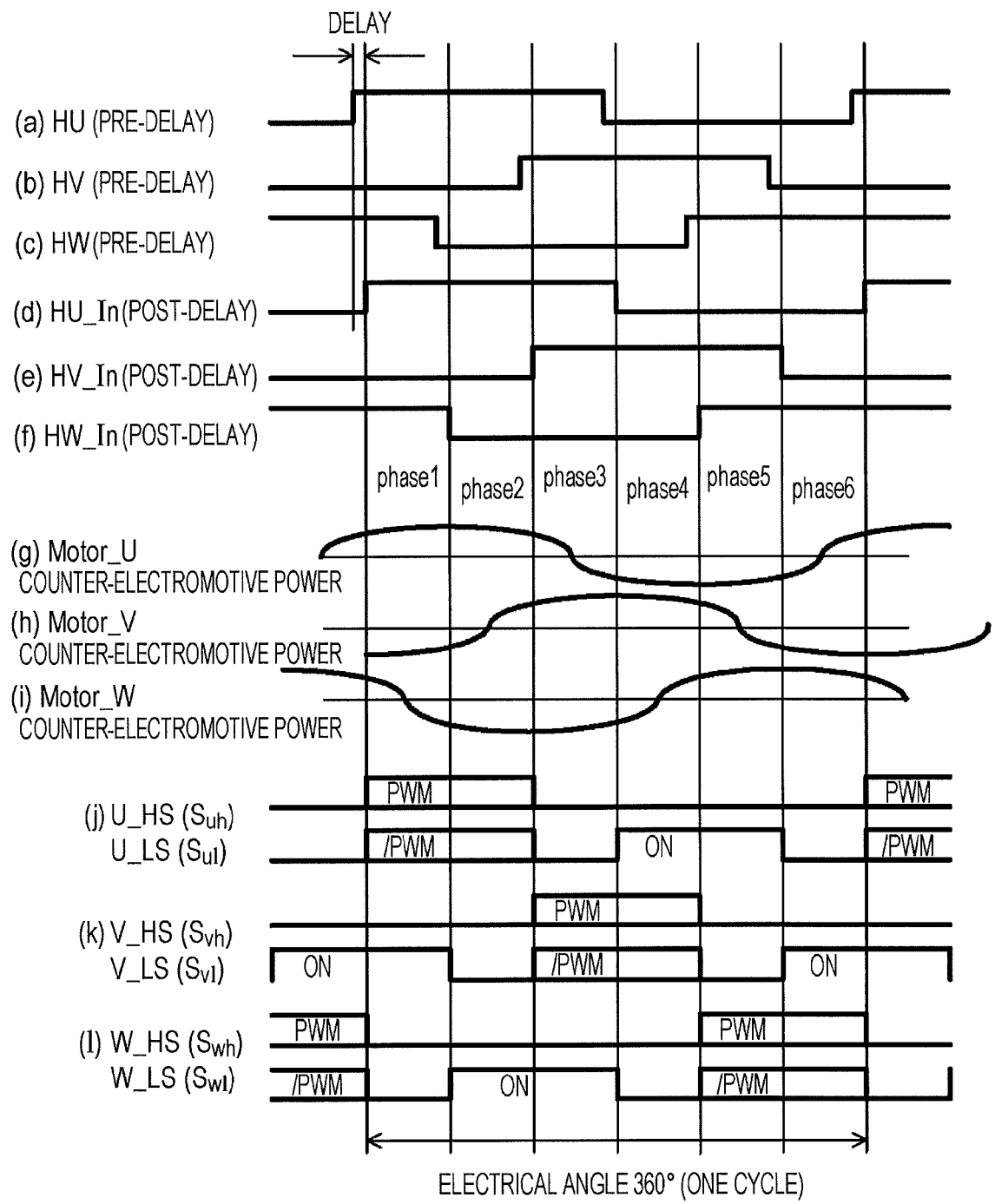
[FIG. 10] FIG. 10(*a*) through (*l*) are waveform diagrams describing basic operation of a motor drive.

The basic operation of the motor drive configured as illustrated in FIG. 9 will be described using FIG. 10(*a*) through (*l*). FIG. 10(*a*) illustrates the hall signal HU for the U phase output by the motor 105, FIG. 10(*b*) illustrates the hall signal HV for the V phase output by the motor 105, and FIG. 10(*c*) illustrates the hall signal HW for the W phase output by the motor 105. As will be described later, according to the present embodiment, the hall effect sensor of the motor 105 is set so that the hall signal is output at a phase slightly ahead as illustrated in FIG. 10 so that it may be adjusted by the variable delay circuit 1025. Therefore, as illustrated in FIG. 10(*d*), a hall signal HU_In for the U phase after adjustment is output from the variable delay circuit 1025 to the motor drive timing generator unit 1026, and as illustrated in FIG. 10(*e*), a hall signal HV_In for the V phase after adjustment is output from the variable delay circuit 1025 to the motor drive timing generator unit 1026, and as illustrated in FIG. 10(*f*), a hall signal HW_In for the W phase after adjustment is output from the variable delay circuit 1025 to the motor drive timing generator unit 1026.

Further, a hall signal cycle 1, as a 360 degree electrical angle, is divided into 6 phases.

Also, as illustrated in FIG. 10(*g*) through (*i*), a Motor_U counter-electromotive force is generated by a terminal for the U phase, a Motor_V counter-electromotive force is generated by a terminal for the V phase, and a Motor_W counter-electromotive force is generated by a terminal for the W phase, all of which are so-called counter-electromotive force voltages. As illustrated in FIG. 10(*j*) through (*l*), switching signals are output to a gate of each FET in the FET bridge 1030 to drive the motor 105 by applying the drive voltage after adjusting the phase to this kind of motor counter-electromotive force voltage. U_HS in FIG. 10(*j*) represents the gate signal of the high side FET ($S_{uh}$) for the U phase, and U_LS in FIG. 10(*j*) represents the gate signal of the low side FET ($S_{ul}$) for the U phase. PWM and /PWM represent the period to be turned on/off by the duty cycle corresponding to the PWM code, which is the calculation result from the calculating unit 1021, and as this is a complementary type, when the PWM is on, /PWM is off, and when PWM is off, /PWM is on. The on interval for the low side FET ($S_{ul}$) is always on. V_HS in FIG. 10(*k*) represents the gate signal of the high side FET ($S_{vh}$) for the V phase, and V_LS represents the gate signal of the low side FET ($S_{vl}$) for the V phase. The signals have the same meaning as those in FIG. 10(*j*). Further, W_HS in FIG. 10(*l*) represents the gate signal of the high side FET ($S_{wh}$) for the W phase, and W_LS in represents the gate signal of the low side FET ($S_{wl}$) for the W phase. The signals have the same meaning as those in FIG. 10(*j*).

In this way, the U phase FET ($S_{uh}$ and $S_{ul}$) are a first phase and a second phase performed by PWM switching, and the U phase of the low side FET ($S_{ul}$) is turned on by a fourth phase and a fifth phase. Also, the V phase FET ($S_{vh}$ and $S_{vl}$) are a third phase and a fourth phase performed by PWM switching, and the V phase of the low side FET ($S_{vl}$) is turned on by a sixth phase and the first phase. Also, the W phase FET ($S_{wh}$ and $S_{wl}$) are the fifth phase and the sixth phase performed by PWM switching, and the W phase of the low side FET ($S_{wl}$) is turned on by the second phase and the third phase.

By outputting such signals and controlling the duty cycle to a preferable state, the motor 105 may be driven at the desired torque.

Figure 11:
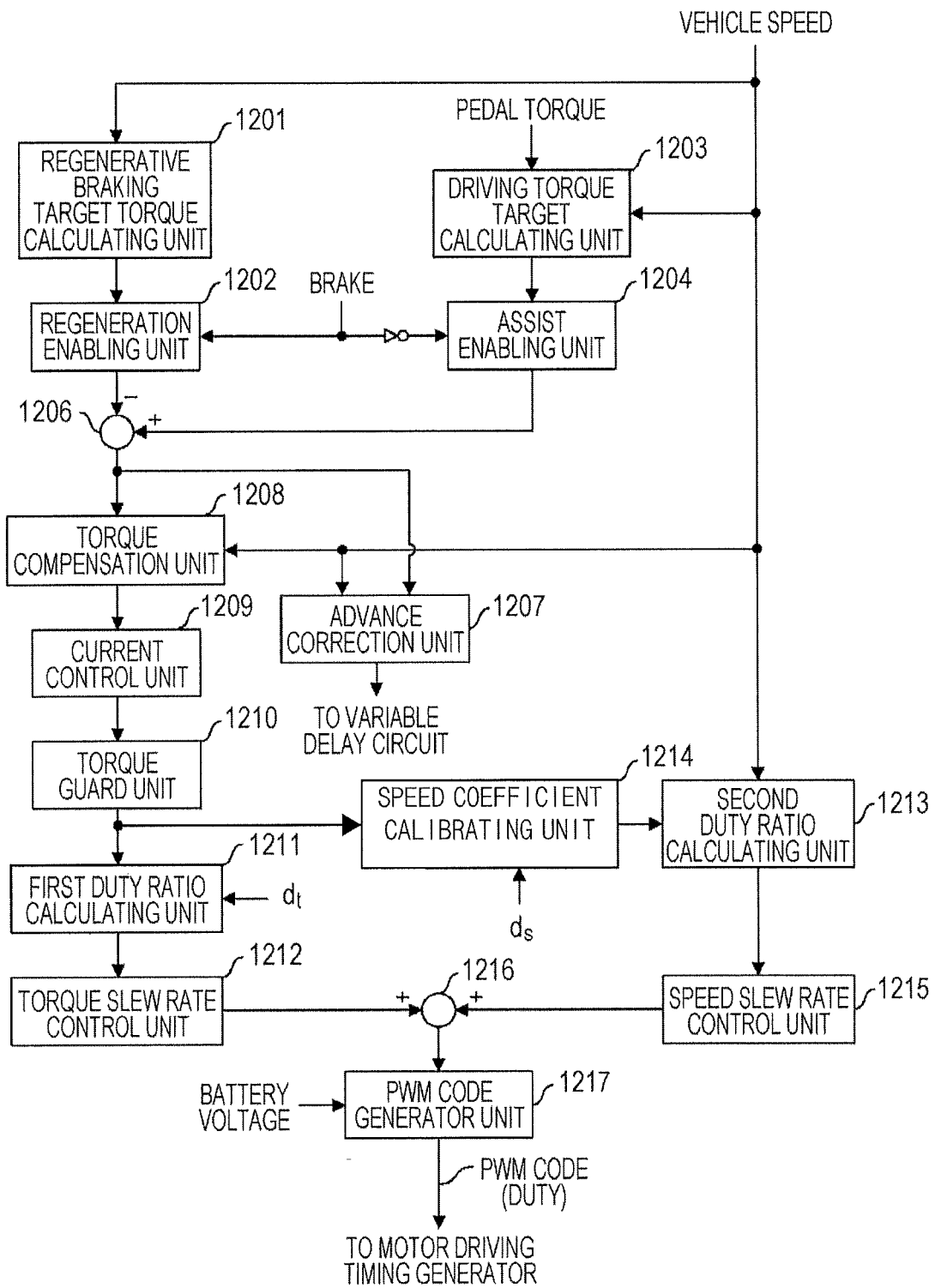
[FIG. 11]

Next, FIG. 11 is a functional block diagram of the calculating unit 1021. The calculating unit 1021 includes a regenerative brake target torque calculating unit 1201, a regeneration enabling unit 1202, a drive torque target calculating unit 1203, an assist enabling unit 1204, an adding unit 1206, an advance correction unit 1207, a torque correction unit 1208, a current control unit 1209, a torque guard unit 1210, a first duty cycle conversion unit 1211, a torque slew rate restricting unit 1212, a second duty cycle conversion unit 1213, a speed coefficient calibrating unit 1214, a speed slew rate restricting unit 1215, a calculating unit 1216, and a PWM code generator unit 1217.

The vehicle speed value from the vehicle speed input unit 1024 and the pedal torque value from the torque input unit 1027 are input into the drive torque target calculating unit 1203, where the assist torque value is calculated. The calculation content of the drive torque target calculating unit 1203 will not be described in detail regarding the present embodiment, as this is not so important here, but for example, the drive torque target calculating unit 1203 extracts the ripple components after smoothing the pedal torque value by an LPF, and calculates an assist torque value corresponding to a value obtained by combining the smoothed pedal torque value and the applicable ripple components at a desired combining ratio. For this calculation, there may be cases in which the combining ratio is adjusted corresponding to vehicle speed, or a calculation may be performed in which an assist ratio is used corresponding to vehicle speed, which is then limited, and then is multiplied by the smoothed pedal torque value. Also, the regenerative brake target torque calculating unit 1201 calculates the regenerative brake target torque value by executing a calculation discussed later corresponding to the vehicle speed value from the vehicle speed input unit 1024.

According to the present embodiment, when an input signal signifying that the brake is present is input from the brake input unit 1028, the regeneration enabling unit 1202 outputs the regeneration target torque value from the regenerative brake target torque calculating unit 1201 to the adding unit 1206. In any other case, a zero is output. In contrast, when an input signal signifying that the brake is not present is input from the brake input unit 1028, the assist enabling unit 1204 outputs the assist torque value from the drive torque target calculating unit 1203. In any other case, a zero is output.

The adding unit 1206 inverses the polarity of and outputs the regeneration target torque value from the regeneration enabling unit 1202, or outputs the assist torque value from the assist enabling unit 1204 as it is.

The description below will refer to both the assist torque value and the regeneration target torque value as the target torque for simplification of the description.

The advance correction unit 1207 performs a calculation corresponding to the vehicle speed value and the target torque value, and outputs the calculation result to the variable delay circuit 1025. Also, the torque correction unit 1208 performs a calculation discussed later corresponding to the target torque value and the vehicle speed value, and outputs the calculation result to the current control unit 1209. Further, the current control unit 1209 performs a calculation discussed later on the output from the torque correction unit 1208, and outputs the calculation result. The torque guard unit 1210 executes a calculation on the output from the current control unit 1209, for example, the torque processing unit 750 of the second Embodiment (however, the first duty cycle conversion unit 764 is removed). Next, the calculation result is output to the first duty cycle conversion unit 1211. The first duty cycle conversion unit 1211 calculates a torque duty code by multiplying the output from the torque guard unit 1210 with the conversion coefficient $d_s$ and outputs this to the torque slew rate restricting unit 1212. The torque slew rate restricting unit 1212 executes a well-known slew rate restriction processing on the output from the first duty cycle conversion unit 1211, and outputs the processing result to the adding unit 1216.

Also, the speed coefficient calibrating unit 1214 adjusts the conversion coefficient $d_s$ corresponding to the target torque value, and outputs this to the second duty cycle conversion unit 1213. The second duty cycle conversion unit 1213 calculates the vehicle speed duty code by multiplying the vehicle speed value with the adjusted conversion coefficient $d_s$ and outputs this to the speed slew rate restricting unit 1215. The speed slew rate restricting unit 1215 executes a well-known slew rate control processing on the output from the second duty cycle conversion unit 1213, and outputs the processing result to the adding unit 1216.

The adding unit 1216 adds the torque duty code from the torque slew rate restricting unit 1212 and the vehicle speed duty code from the speed slew rate restricting unit 1215, calculates the duty code, and outputs this to the PWM code generator unit 1217. The PWM code generator 1217 generates the PWM code by multiplying the duty code with the value of the battery voltage from the AD input unit 1029 divided by the reference voltage (for example, 24 V). The PWM code is output to the motor drive timing generator unit 1026.

The following describes specifically the calculation content of the main configuration elements.

(1) Vehicle Speed Input Unit 1024

According to the present embodiment and as previously described, many calculations based on the vehicle speed are performed, and so obtaining a correct vehicle speed is necessary for accuracy.

Figure 12:
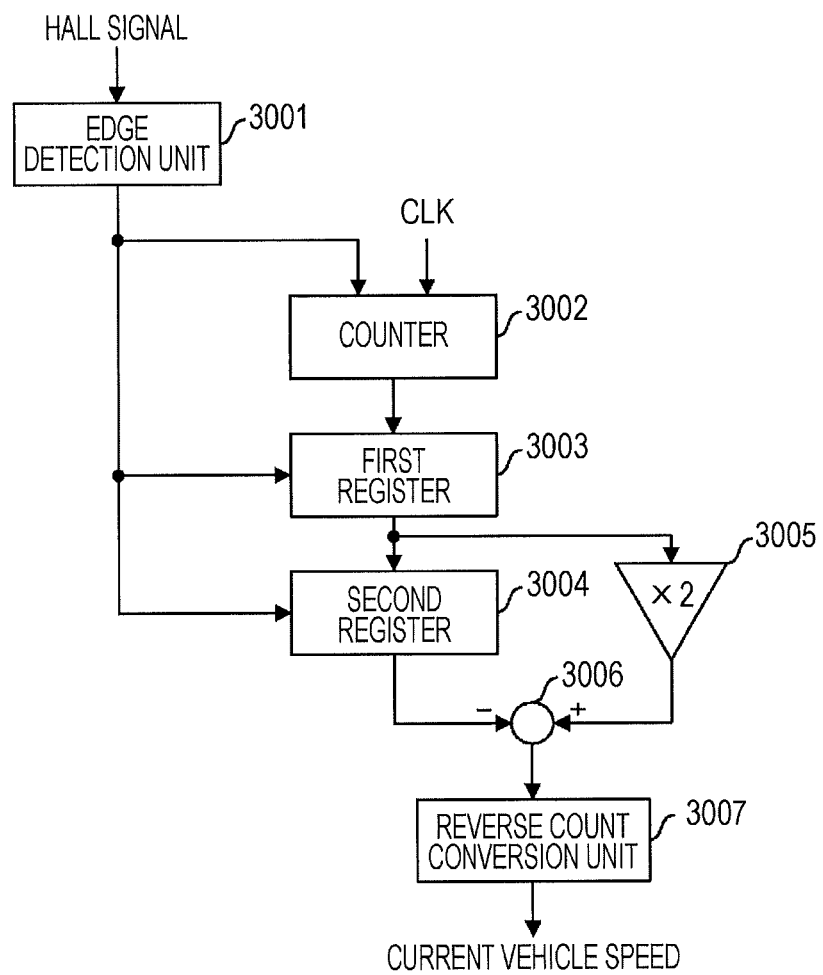
[FIG. 12]

For this reason, FIG. 12 is a functional block diagram illustrating an example of the vehicle speed input unit 1024. In the example of FIG. 12, the vehicle speed input unit 1024 includes an edge detection unit 3001, a counter 3002, a first register 3003, a second register 3004, a multiplying unit 3005, an adding unit 3006, and an inverse count conversion unit 3007. A hall signal is input into the edge detection unit 3001, in which the initiation of the hall signal is detected, and a detection signal is output to the counter 3002, the first register 3003, and the second register 3004. The counter 3002 resets the current count value corresponding to the detection signal from the edge detection unit 3001, and starts a clock (CLK) count. Also, the first register 3003 and the second register 3004 outputs the number value it is holding. However, the initial holding value defaults to zero.

Also, the counter 3002 outputs the current count value corresponding to the next detection signal from the edge detection unit 3001 to the first register 3003, and at the same time resets the current count value and restarts the clock CLK count. Also, the first register 3003 outputs the value currently held, and at the same time holds the output value from the counter 3002. Also, the second register 3004 outputs the value currently held, and at the same time holds the value from the first register 3003.

Further, when the counter 3002 receives the next detection signal from the edge detection unit 3001, it outputs the current count value to the first register 3003, and at the same time resets the current count value and restarts the clock CLK count. Also, the first register 3003 outputs the value currently held, and at the same time holds the output value from the counter 3002. Also, the second register 3004 outputs the value currently held, and at the same time holds the value from the first register 3003.

In this way, the counter 3002 counts a value equivalent to the cycle of the hall signal initiation, and the second register 3004 holds the value for the two previous cycles, and the first register 3003 holds the value for the previous cycle.

Also, the multiplying unit 3005 multiplies the output value from the first register 3003 by two, and the adding unit 3006 executes a calculation to subtract the output value from the second register 3004 from the output value from the multiplying unit 3005. That is to say, a value is calculated from multiplying the previous cycle value by two, and then subtracting the value from the previous two cycles from this value.

Lastly, the inverse count conversion unit 3007 obtains the predicted current vehicle speed if the adding unit 3006 calculates an inversed output value.

Figure 13:
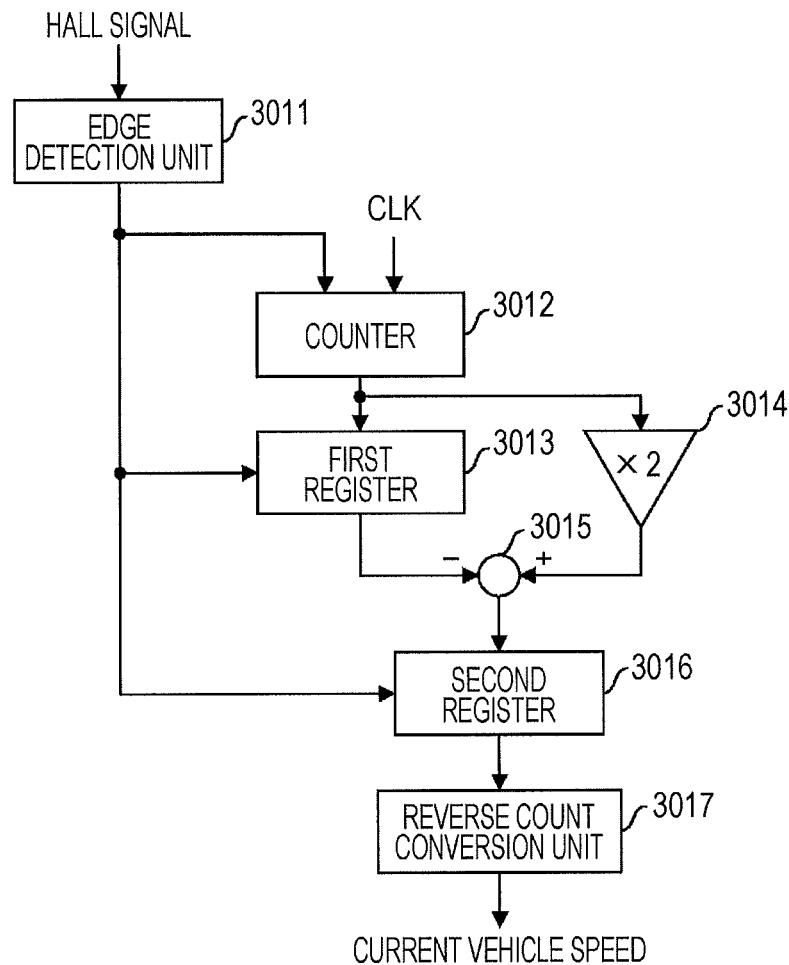
[FIG. 13]

Also, the calculation by the vehicle speed input unit 1024 as illustrated in FIG. 12 is may be realized per the functional block diagram as illustrated in FIG. 13. The vehicle speed input unit 1024 in FIG. 13 includes an edge detection unit 3011, a counter 3012, a first register 3013, a multiplying unit 3014, an adding unit 3015, a second register 3016, and an inverse count conversion unit 3017.

The basic operation is mostly the same as that for FIG. 12, but the first register 3013 holds the previous cycle value, and the multiplying unit 3014 multiplies the value output by the counter 3012 (current cycle) by two, and outputs this. Also, the adding unit 3015 executes a calculation to subtract the previous cycle value from the value of the current cycle that has been multiplied by two, and outputs this to the second register 3016. The second register 3016 stores the predicted value for the previous cycle, and then the second register 3016 outputs this to the inverse count conversion unit 3017 corresponding to the detection signal from the edge detection unit 3011, and at the same time holds the output value from the adding unit 3015. The inverse count conversion unit 3017 calculates the inverse of the predicted value for the previous cycle, and obtains the predicted current vehicle speed.

By executing these kinds of calculations, the vehicle speed may be predicted with good accuracy.

(2) Advance correction Unit 1207

Armature reactions from the effects of inductance caused by the coil of the motor 105, or mutual inductance caused by surrounding coils, or reluctance from iron cores may cause distortions in transfer of back EMF, wave form, and levels due to the effect of the magnetic field output from its coil depending on the speed and current at that time, which may also cause the target torque to not be output. The advance correction is executed to correct these issues.

As previously described for FIG. 9, a hall effect sensor is set in the motor 105 to output a hall signal that slightly advances the phase, for example, and the variable delay circuit 1025 either advances or delays the phase of the hall signal corresponding to the output from the calculating unit 1021.

Figure 14:
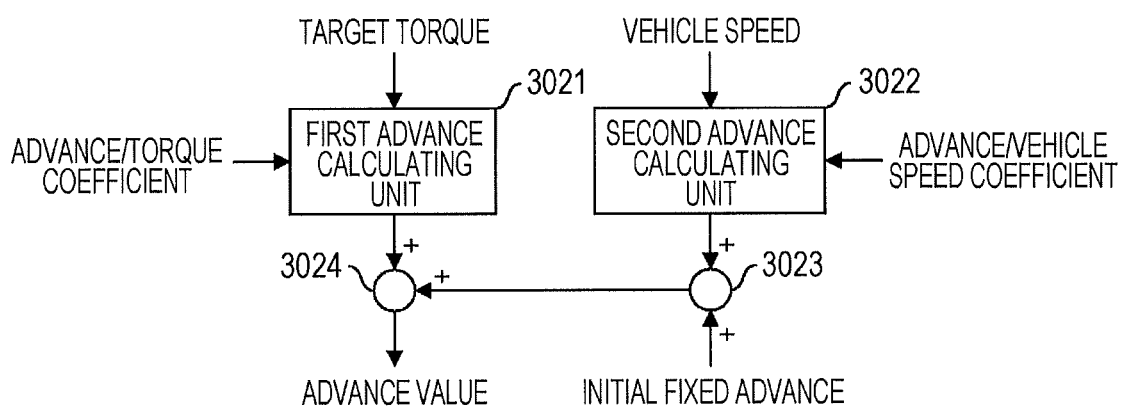
[FIG. 14]

The advance correction unit 1207 in the present embodiment (refer to FIG. 11) is realized per the functional block configuration as illustrated in FIG. 14 for example. This example illustrates a configuration example in which the advance value is affected by the independent influence of the vehicle speed and the torque.

The advance correction unit 1207 in FIG. 14 includes a first advance calculating unit 3021, a second advance calculating unit 3022, and an adding unit 3023 and 3024.

In this case, the first advance calculating unit 3021 multiplies the previously set coefficient (advance divided by torque) to the target torque value, and calculates the first advance value. Also, the second advance calculating unit 3022 multiples the previously set coefficient (advance divided by vehicle speed) to the vehicle speed, and calculates the second advance value. The adding unit 3023 adds the second advance value and the previously set initial fixed advance value (previous advance value previously of the hall signal), and outputs the calculation result to the adding unit 3024. The adding unit 3024 adds the calculation result from the adding unit 3023 and the first advance value, and obtains the advance value.

In this way, for this model where the influence of the vehicle speed and the torque are independently received, adjustment is possible by preparing conversion coefficients for each of these.

Figure 15:
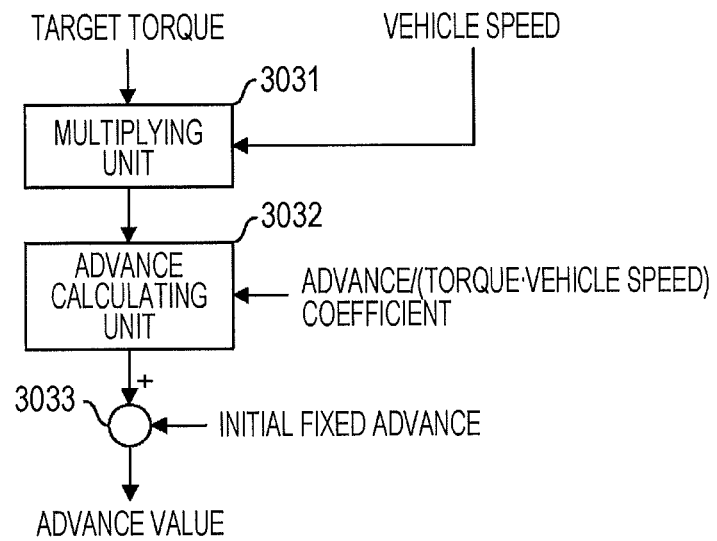
[FIG. 15]

In contrast, if the advance value is affected by the influence of the vehicle speed and the torque as a synergistic result, the advance correction unit 1207 is realized, for example, with the functional block configuration as illustrated in FIG. 15.

The advance correction unit 1207 in the example in FIG. 15 includes a multiplying unit 3031, an advance calculating unit 3032, and an adding unit 3033. The multiplying unit 3031 calculates, for example, the product of the target torque value and the vehicle speed value, and outputs this to the advance calculating unit 3032. The advance calculating unit 3032 multiplies a previously set coefficient (advance divided by the product of the torque and the vehicle speed) to the output value from the multiplying unit 3031, and calculates the variation amount of the advance value. The adding unit 3033 adds this output value from the advance calculating unit 3032 and a previously set initial fixed advance value, and so calculates the advance value.

Even for such a situation, the advance value may be adjusted by preparing a suitable conversion coefficient from the coefficient of (advance divided by the product of the torque and the vehicle speed).

(3) Torque Correction Unit 1208

Figure 16:
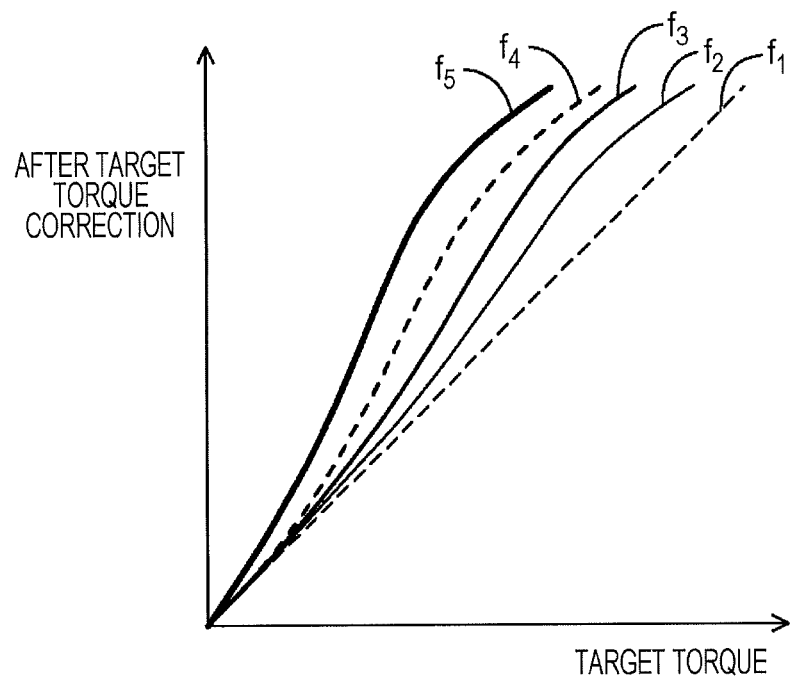
[FIG. 16]

The torque correction unit 1208 corrects the target torque corresponding to the current vehicle speed. For example, a correction function as illustrated in FIG. 16 is applied. For the example in FIG. 16, the straight line $f_1$ represents a function when the input target torque is output as it is as the target torque after correction. The curve $f_2$ represents a function when the vehicle speed is zero, and also, the curve $f_3$ represents a function during low vehicle speed greater than zero (a first vehicle speed range). The curve $f_4$ represents a function during medium vehicle speeds (a second vehicle speed range faster than the first vehicle speed range), and further, the curve $f_5$ represents a function during fast vehicle speeds (a third vehicle speed range faster than the second vehicle speed range). Further, the shape of the curve is determined depending on the type of motor. The motor in the example for FIG. 16 is a brushless current rectifier with an iron core.

In this way, a function that causes a larger target torque value to be output as the vehicle speed increases may be employed. In this way, a target torque value may be output that maintains the current vehicle speed or raises it.

(4) Current Control Unit 1209

The circuit as illustrated in FIG. 9 performs two types of current control, (A) control of the discharge current and charge current to/from the secondary battery 101, and (B) current control depending on the temperature of the FET bridge 1030. However, as this serves as the overall torque and feed forward control, no feedback control is performed on the motor drive current, and so control of the target torque value is added from the PWM code for the power supply voltage at one previous unit of time and the temperature of the FET bridge 1030.

Figure 17:
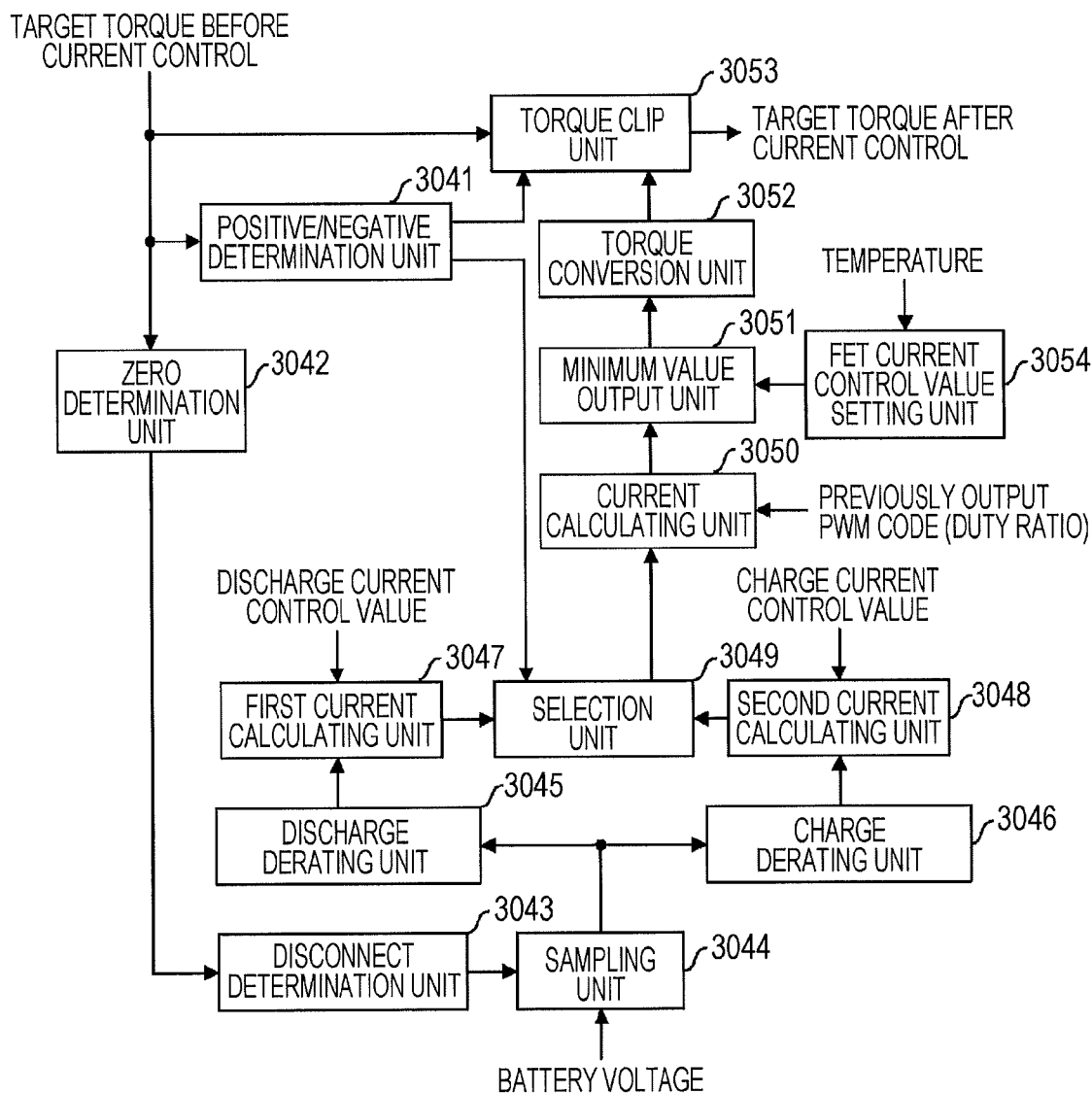
[FIG. 17]

For this reason, the current control unit 1209 related to the present embodiment as illustrated in FIG. 17 includes a positive and negative determination unit 3041, a zero determination unit 3042, a disconnect determination unit 3043, a sampling unit 3044, a discharge derating unit 3045, a charge derating unit 3046, a first current conversion unit 3047, a second current conversion unit 3048, a selection unit 3049, a current conversion unit 3050, a minimum value output unit 3051, a FET current control value setting unit 3054, a torque conversion unit 3052, and a torque clip unit 3053.

The positive and negative determination unit 3041 determines the code from the input target torque value (target torque value before current control), and outputs a signal signifying whether it is positive or negative to the torque clip unit 3053 and the selection unit 3049. The zero determination unit 3042 determines whether the input target torque value is zero, if the target torque value is a zero, no further processing is necessary, and so does not output anything. In contrast, if the target torque value is not zero, then it is output to the disconnect determination unit 3043. The disconnect determination unit 3043 confirms, for example, whether a fourth unit period that has a value of 0 has been disconnected, and then outputs sampling instructions to the sampling unit 3044.

The sampling unit 3044 outputs the power supply voltage value from the AD input unit 1029 to the discharge derating unit 3045 and the charge derating unit 3046 while receiving the sampling instructions from the disconnect determination unit 3043.

Figure 18:
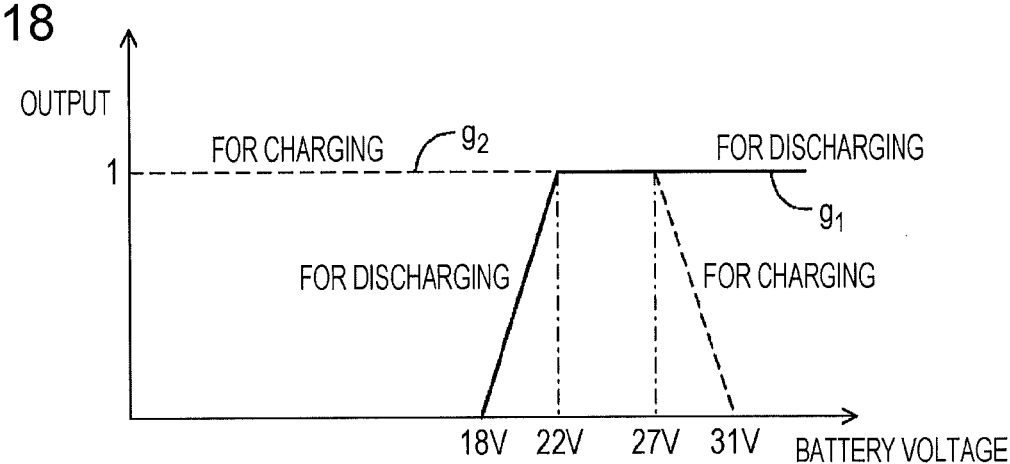
[FIG. 18]

According to the present embodiment and as illustrated in FIG. 18, a discharge derating curve $g_1$ and a charge derating curve $g_2$ are previously set corresponding to the secondary battery 101. For this example, the discharge derating unit 3045 outputs a value to either stepwise increase or consecutively and monotonically increase the current value during a period from zero to one, which is a period in which the power supply voltage increases from 18 V to 22 V, so when it is less than 18 V, a zero is output, and when there is only a small charge remaining, over-discharging is prevented. Also, the discharge derating unit 3045 outputs a one when the power supply voltage is over 22 V. In contrast, the charge derating unit 3046 outputs a zero when the power supply voltage is over 31 V, and outputs a value to either stepwise decrease or consecutively and monotonically decrease the current value during a period from zero to one, which is a period in which the power supply voltage is from 27 V to 31 V, and so overcharging is prevented. Also, the charge derating unit 3046 outputs a one if the power supply voltage is less than 27 V.

The first charge conversion unit 3047 calculates the product (equals the current control value) of the output value from the discharge derating unit 3045 and a previously set discharge current control value, and outputs this to the selection unit 3049. In contrast, the second current conversion unit 3048 calculates the product (equals the current control value) of the output value from the charge derating unit 3046 and a previously set charge current control value, and outputs this to the selection unit 3049.

The selection unit 3049 outputs the output from the first current conversion unit 3047 to the current conversion unit 3050 when the output from the positive and negative determination unit 3041 signifies a positive value. In contrast, the selection unit 3049 outputs the current control value from the second current conversion unit 3048 to the current conversion unit 3050 when the output from the positive and negative determination unit 3041 signifies a negative value.

The current conversion unit 3050 calculates the current control value of the motor drive current by dividing the current control value output from the selection unit 3049 by the PWM code for the one previous time unit.

As illustrated in FIG. 2, the switching amp may be regarded as a DC transformer, and as long as there is no loss from the switching elements, or the like, the following expression is established.

$$\text{Power supply voltage} * \text{duty cycle} = \text{motor drive voltage} \quad (1)$$

The switching amp converts constant voltage, and so the following expression is established to inversely relate the current and the voltage.

$$\text{Battery current}/\text{duty cycle} = \text{motor drive current} \quad (2)$$

Therefore, the current conversion unit 3050 calculates the current control value for the motor drive current from the value of the current control value divided by the PWM code obtained from the power supply voltage.

Further, there may be cases when the PWM code is zero, so a minimum value, for example, is set to prevent division by zero, and this minimum value is used to perform the division in the event that the value is at or below the minimum value.

Figure 19:
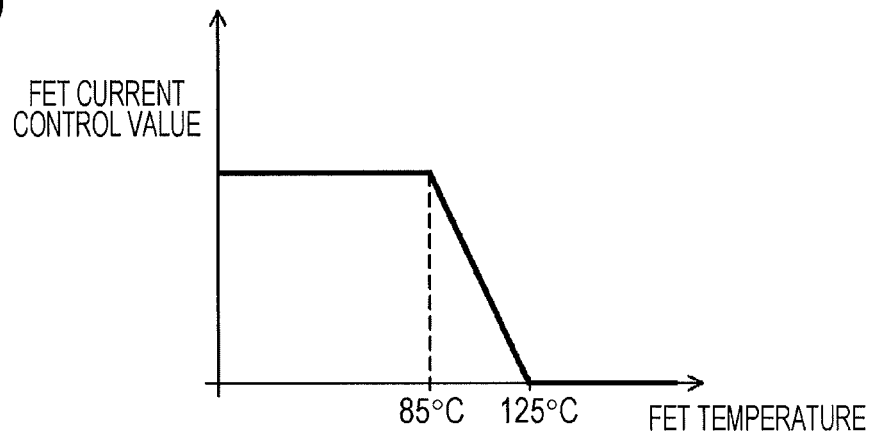
[FIG. 19]
Figure 20:
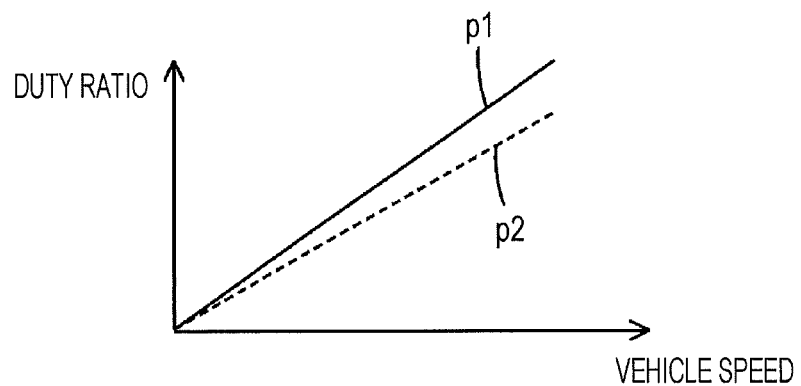
[FIG. 20]

In contrast, the FET current control value setting unit 3054 outputs the FET current control value corresponding to the temperature from the temperature input unit 1022, from a function as illustrated in FIG. 19 for example. In the example in FIG. 19, the FET current control value is a constant value until the FET temperature reaches 85° C., and is gradually reduced as the temperature rises over 85° C., and when the temperature reaches 125° C., the FET current control value becomes zero. The FET current control value setting unit 3054 follows this kind of curve, defines a FET current control value, and outputs this to the minimum value output unit 3051.

Further, this can be expressed in the following expression.

FET current control value=(constant temperature (125° C.)−FET temperature)*FET current control value/(constant temperature (125° C.)−derating start temperature (85° C.))

The minimum value output unit 3051 defines the smaller value between the output from the current conversion unit 3050 (current control value for the motor drive current) and the output from the FET current control value setting unit 3054 (FET current control value), and outputs this to the torque conversion unit 3052.

The torque conversion unit 3052 calculates the conversion torque value by multiplying the output value from the minimum value output unit 3051 with a previously set conversion coefficient (torque divided by current), and outputs this to the torque clip unit 3053. The torque clip unit 3053 outputs target torque value before control as the target torque value after control when the target torque value before control is less than the conversion torque value from the torque conversion unit 3052. In contrast, when the target torque value before control is larger than the conversion torque value from the torque conversion unit 3052, the conversion torque value is output as the target torque value after control.

As previously described, executing these kinds of calculations enables the target torque value to be generated using two torque feed forward current controls, so as to satisfy current restriction such as (1) restriction of discharge current and charge current of the secondary battery 101, and (2) current restriction depending on the temperature of the FET bridge 1030.

(5) First Duty Cycle Conversion Unit 1211

The first duty cycle conversion unit 1211 multiplies the output from the torque guard unit 1210 with a previously set conversion coefficient (duty cycle divided by a torque equal to $d_t$), and calculates a torque duty code. Further, this torque duty code is output to the adding unit 1216 via the torque slew rate restricting unit 1212.

(6) Speed Coefficient Calibrating unit 1214 The second duty cycle conversion unit 1213 multiplies the current vehicle speed value with a conversion coefficient (duty cycle divided by a vehicle speed equal to $d_s$) to calculate the vehicle speed duty code.

This conversion coefficient $d_s$ is the conversion coefficient used to calculate the duty cycle when a counter-electromotive force is generated by the motor 105 corresponding to this speed, and is principally requested because of the basic property of the motor 105.

However, with actual motors, there are variable elements such as variance and degradation, using the principally set conversion coefficient $d_s$ in shipped product may cause the speed duty code to be too large or too small when there are variances in the actual motor properties. For example, in FIG. 20, the dotted line $p_2$ represents a motor property that corresponds to the duty cycle Duty corresponding to the vehicle speed. In this case, when the value of the conversion coefficient $d_s$ is large, the motor property is assumed to be like that illustrated by the solid line $p_1$ in FIG. 20, and so the duty cycle Duty is normally greater than the corresponding vehicle speed, which results in a power running state even though the control specifies zero torque. In contrast, when the value of the conversion coefficient $d_s$ is small, this results in a braking state even though the control specifies zero torque.

Therefore, the calculation described below is used to dynamically correct the conversion coefficient $d_s$.

Specifically, when the switching performed by the switches in the FET bridge 1030 does not occur at all, the motor drive current is zero. In contrast, when the target torque value is zero, normally the counter-electromotive force of the motor 105 and the supply voltage from the switching amp match, and so the motor drive current is also zero. However, when the conversion coefficient $d_s$ is a bit off, even if the target torque value is zero, torque is generated, and motor drive current flows, and so the motor drive current is measured in this case, and conversion coefficient $d_s$ is adjusted so that current does not flow.

Figure 21:
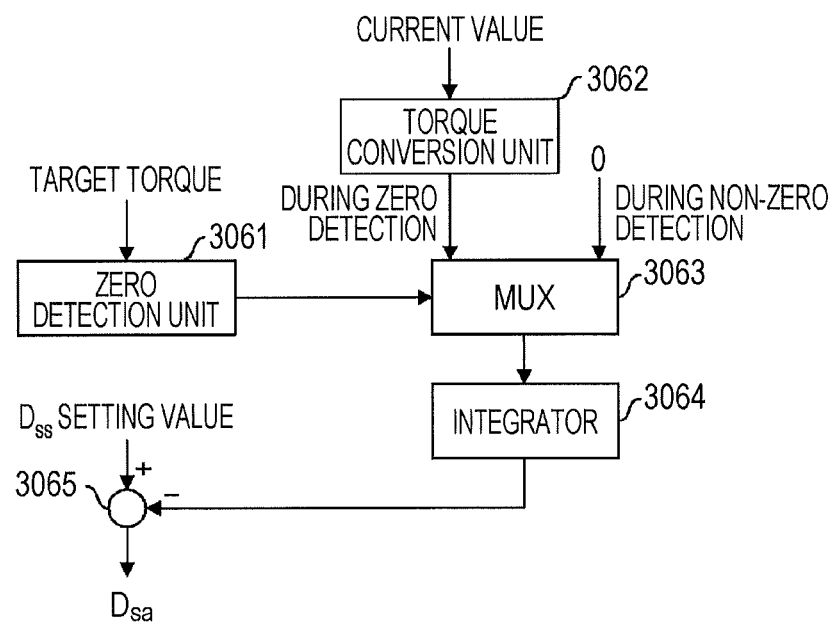
[FIG. 21]

For this reason, the speed coefficient calibrating unit 1214 is realized, for example, with the functions as illustrated in the functional block diagram in FIG. 21.

That is to say, the speed coefficient calibrating unit 1214 includes a zero detection unit 3061, a torque conversion unit 3062, a multiplexor (MUX) 3063, an integrator 3064, and an adding unit 3065.

The torque conversion unit 3062 multiplies the current value from the current detection unit 1023 with a previously determined conversion coefficient (torque divided by current), and calculates a torque value equivalent to the motor drive current. Also, the zero detection unit 3061 determines whether the target torque value is zero, and when it is detected to be zero, outputs a detection signal to the multiplexor 3063. The multiplexor 3063 outputs the output value from the torque conversion unit 3062 to the integrator 3064 when the detection signal from the zero detection unit 3061 is output, and outputs a zero to the integrator 3064 when the detection signal is not output.

The integrator 3064 integrates the output value from the multiplexor 3063 at a predetermined time, and outputs the integration result to the adding unit 3065. The adding unit 3065 subtracts the integration result from a previously set conversion coefficient $D_{ss}$ to calculate the conversion coefficient $D_{sa}$ to be used this time, and outputs this to the second duty cycle conversion unit 1213.

In this way, for such cases when the motor drive current flows despite the target torque value being zero, the conversion coefficient $D_{ss}$ may be adjusted to bring this value to zero.

Figure 22:
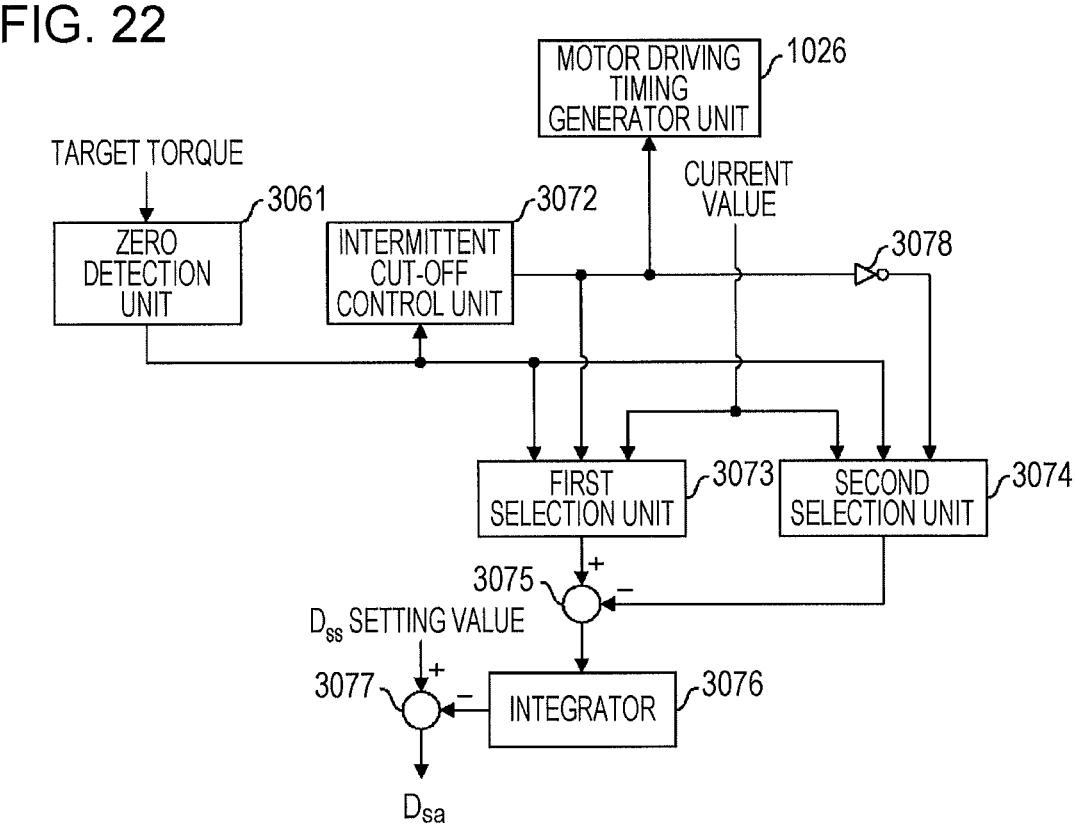
[FIG. 22]

Also, the speed coefficient calibrating unit 1214 may also be realized with the functions as illustrated in the functional block diagram in FIG. 22, for example.

That is to say, the speed coefficient calibrating unit 1214 includes the zero detection unit 3061, an intermittent cut-off control unit 3072, a first selection unit 3073, a second selection unit 3074, an adding unit 3075, an integrator 3076, an adding unit 3077, and an inversion unit 3078.

The zero detection unit 3061 determines whether the target torque value is zero, and if a zero is detected, outputs a detection signal to the intermittent cut-off control unit 3072, the first selection unit 3073, and the second selection unit 3074. When the intermittent cut-off control unit 3072 receives the detection signal from the zero detection unit 3061, it intermittently outputs a cut-off signal to the motor drive timing generator unit 1026 to stop the switching of the switches in the FET bridge 1030.

The first selection unit 3073 selects and outputs the current value from the current detection unit 1023 when the detection signal is output from the zero detection unit 3061 and the cut-off signal is output from the intermittent cut-off control unit 3072. In contrast, the second selection unit 3074 selects and outputs the current value from the current detection unit 1023 when the detection signal is output from the zero detection unit 3061 and the cut-off signal is not output from the intermittent cut-off control unit 3072 (that is to say, the inverse unit 3078 turns on the cut-off signal from the intermittent cut-off control unit 3072 when off). Also. The adding unit 3075 subtracts the output value from the second selection unit 3074 from the output value from the first selection unit 3073 to calculate the difference.

In this way, even when some difference occurs with the current detection unit 1023 itself, this effect from the current detection unit 1023 may be cancelled by calculating the difference between the output of the first selection unit 3073 and the second selection unit 3074.

Also, the integrator 3076 integrates the output value from the adding unit 3075 at a predetermined time, and outputs the integration result to the adding unit 3077. The adding unit 3077 subtracts the integration result from the previously set conversion coefficient $D_{ss}$ to calculate the conversion coefficient $D_{sa}$ to be used this time, and outputs this to the second duty cycle conversion unit 1213.

In this way, for such cases when the motor drive current flows despite the target torque value being zero, the conversion coefficient $D_{ss}$ may be adjusted to bring this value to zero.

Further, this calculation is not normally executed, and is executed for example, when the electrically assisted bicycle 1 is at such a state in which the vehicle speed conditions are stable (5 km/h through 20 km/h) and the acceleration conditions are stable (−0.02 G through +0.02 G).

Also, it is wasteful if these kinds of calculations are performed frequently, and so for such cases when stable such as when the variation range of the conversion coefficient after adjustment is converged, for example, the control time intervals may be changes, such as changing the time to the next calculation to a few minutes later.

(7) Second Duty Cycle Conversion Unit 1213

As previously described, the second duty cycle conversion unit 1213 multiplies the current vehicle speed by the conversion coefficient $D_{sa}$ to calculate the vehicle speed duty code. Further, this vehicle speed duty code is output to the adding unit 1216 via the speed slew rate restricting unit 1215.

(8) PWM Code Generator Unit 1217

The PWM code generator unit 1217 multiplies the duty codes, which are addition results of the torque duty code and the vehicle speed duty code from the adding unit 1216, with value of the power supply voltage from the AD input unit 1029 divided by the reference voltage (24 V for example) to calculate the final PWM code, and outputs this to the motor drive timing generator unit 1026.

(9) Regenerative Brake Target Torque Calculating Unit 1201

The user inputs a brake instruction by using the brake lever, and the brake sensor 104 detects this brake instruction. The brake input unit 1028 outputs the signal signifying that the brake is present (depending on specific implementations, this signal signifies the level of the brake). The brake input unit 1028 performs a calculation as described below on this signal, and calculates a suitable regenerative brake torque value.

Figure 23:
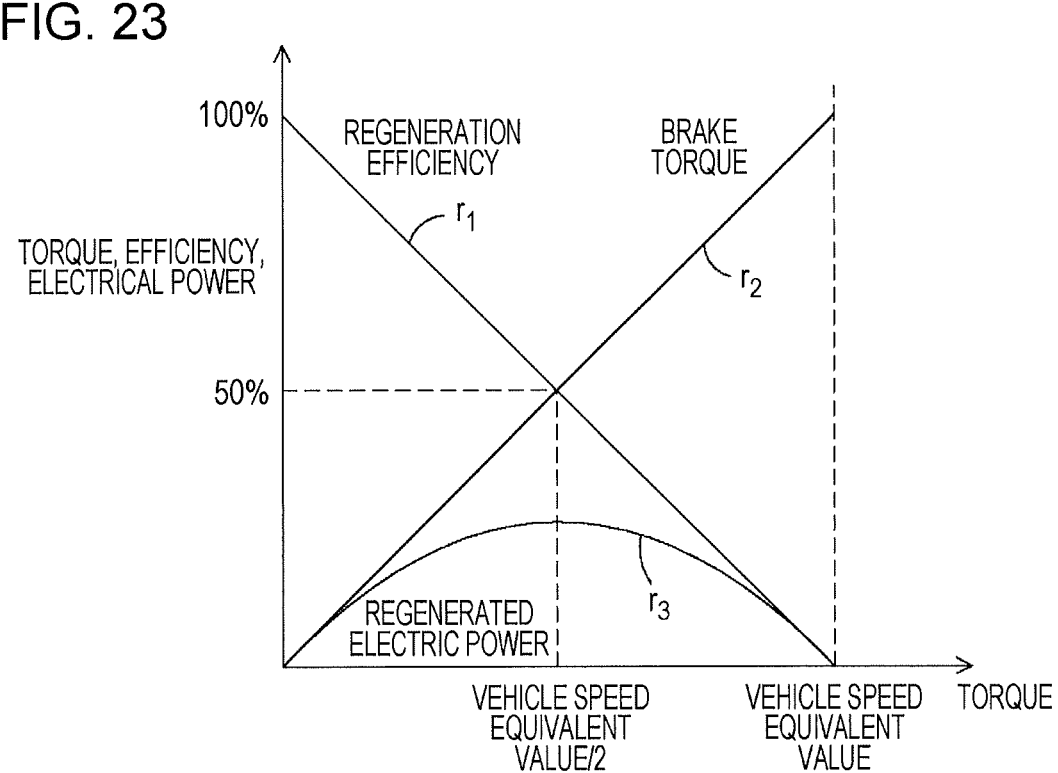
[FIG. 23]

Specifically, this is described using FIG. 23. The horizontal axis in FIG. 23 represents the setting value of the regenerative brake torque, and the vertical axis represents the corresponding torque value, efficiency, and electric power. As illustrated in this graph by the straight line $r_1$, when the regenerative brake torque setting value is equivalent to the vehicle speed value, the regenerative efficiency is zero, and when the regenerative brake torque value is zero, the regenerative efficiency is 100%. In contrast, as illustrated by the straight line $r_2$, when the regenerative brake torque setting value is zero, the brake torque value is zero, and when the regenerative brake torque setting value is equivalent to the vehicle speed value, the brake torque value is equivalent to the vehicle speed value. Thus, from the regenerative efficiency expressed by the straight line $r_1$ and the brake torque expressed by the straight line $r_2$, the regenerative power is as expressed by the curve $r_3$, and the regenerative brake torque setting value regenerates the maximum electric power when the regenerative efficiency is at 50% when the equivalent vehicle speed value is ½.

That is to say, by setting the regenerative brake torque to ½ of the equivalent vehicle speed value, the regenerated electric power is maximized.

Figure 24:
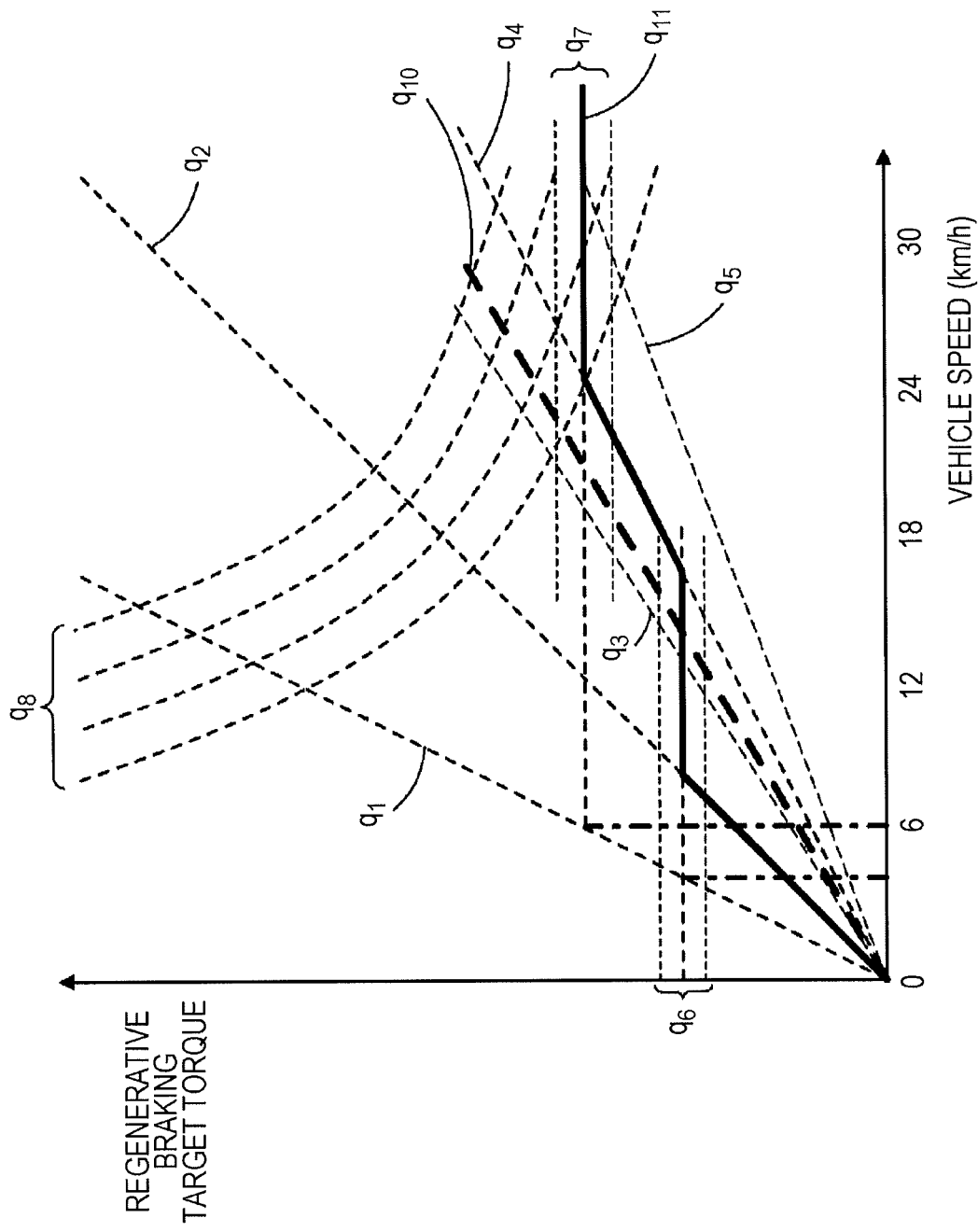
[FIG. 24]
Figure 25:
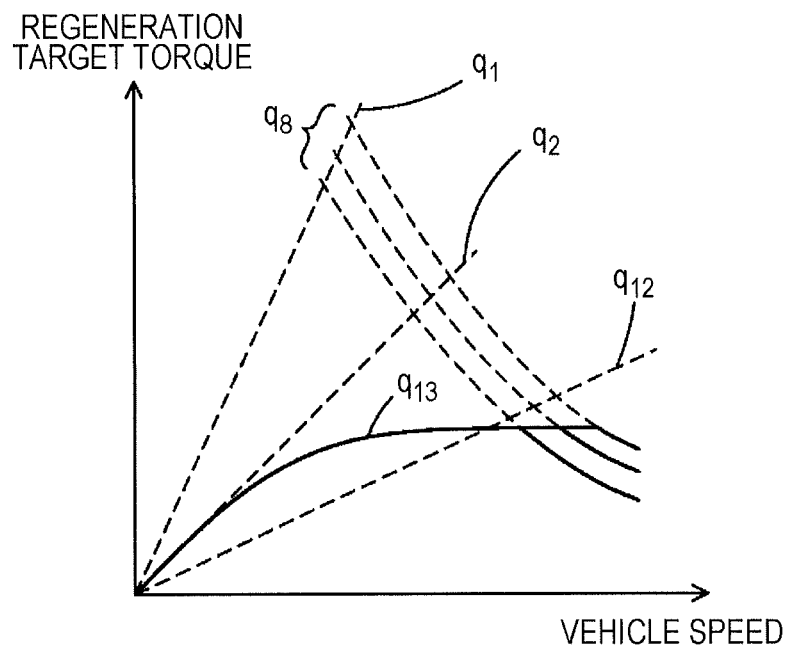
[FIG. 25]
Figure 26:
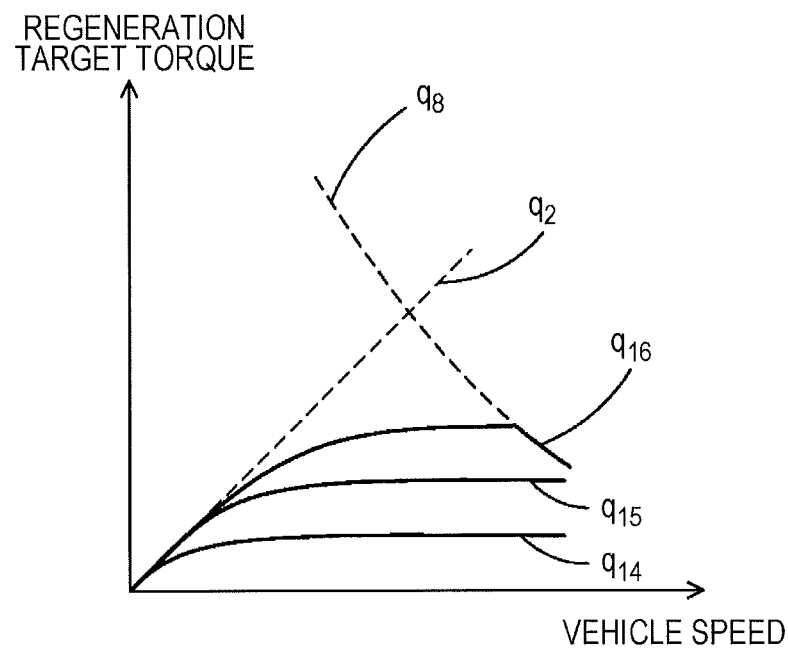
[FIG. 26]

With this as the foundation, FIG. 24 through FIG. 26 is used to describe what kind of regenerative brake target torque values are output by the regenerative brake target torque calculating unit 1201. The horizontal axis in FIG. 24 represents the vehicle speed, and the vertical axis represents the regenerative brake target torque value. The dotted straight line $q_1$ represents vehicle speed–torque relationship when the regenerative brake target torque value of the equivalent vehicle speed value is output, and as described using FIG. 23, the regenerative efficiency is 0% (short brake). The region above this straight line $q_1$ is the brake that provides electric power. Also, the dotted straight line $q_2$ represents the vehicle speed–torque relationship when the regenerative brake target torque value of ½ the equivalent vehicle speed value is output, and as described using FIG. 23, the regenerative efficiency is 50%, which enables the maximum regenerated electric power. The region above this straight line $q_2$ is the region in which the mechanical brake combination is advantageous. Therefore, a suitable curve is implemented at the region below the straight line $q_2$ with added restriction conditions.

The instant regenerative efficiency for each speed is determined by the ratio of the counter-electromotive force voltage for the speed at that instant and the regenerative brake voltage at that instant.

Instant regenerative efficiency=1−(regenerative brake voltage/counter-electromotive force voltage)=1−(regeneration torque/equivalent vehicle speed torque value For the distance from an arbitrary speed to an arbitrary stop request, and at a state with no other restrictions other than the stop distance, the maximum regenerative efficiency during this stop distance, i.e. obtaining the total maximum amount of regenerated electric power needs a curve with an even and constant regenerative efficiency for any speed, i.e. a proportional straight line that passes through the point of origin. The straight line $q_{10}$ is near the X axis when the stop request distance is sufficiently long, and the regenerative efficiency is near 100%. In contrast, when the stop request distance is somewhat small, the straight line $q_{10}$ becomes the same as the straight line $q_2$, in which the maximum instant regenerated electric power may be obtained, and the total regenerative efficiency is 50% at this time. Further, when the stop request distance is even shorter, the regeneration torque curve is the same as the straight line $q_2$, in which the maximum instant regenerated electric power may be obtained, and the mechanical brake must also be combined. If the regenerative brake torque is any larger than this, the instant regenerated electric power actually decreases, and any more than this, it is better to use the mechanical brake.

Also, as restriction conditions that should be considered, there are the dotted straight line $q_7$, which is parallel to the horizontal axis and represents the maximum constant braking line during high speeds, the dotted group of straight lines $q_6$, which are parallel to the horizontal axis and represent the maximum constant brake line during low speeds, and so forth.

When actually implementing the straight line $q_{10}$, the deceleration curve for time is a curve that decays exponentially, and even when the stop distance is constant, the stop time becomes infinite, and so at low speeds, the straight line $q_6$ is implemented to maintain a large torque though sacrificing regenerative efficiency just a bit. Further, when the straight line $q_6$ at low speed is in a region higher than the straight line $q_2$, the regenerative efficiency does not worsen, and the instant regenerated electric power actually decreases, and so there is a transfer to the straight line $q_2$, in which the instant regenerated electric power is maximized for all speeds, and stopping occurs in combination with the mechanical brake.

In contrast, when the speed is high, and the straight line $q_4$, which is a straight line of high efficiency regeneration at a constant rate, is used as it is, the brake torque becomes dangerously large, and so there is a transfer to the straight line $q_7$, in which a constant maximum torque restriction is in place.

For medium speeds, when considering the constant rate brake line (regenerative efficiency from 85% through 65%) from 15% through 35% of the dotted straight lines $q_3$ through $q_5$, there may be cases when the broken line curve as represented by the heavy line $q_{11}$ is implemented. Further, for medium speeds, the straight line $q_4$ is implemented. As a result, highly efficient battery regeneration may be performed during medium speeds.

Further, as additional restriction conditions, there are the group of curves $q_8$ which represent the battery charge current control line set based on the secondary battery 101 (differs depending on the battery type and state), and a straight line $q_2$ which is the line at 50% regenerative efficiency during low speeds.

When the battery voltage is constant, the regenerated electric power is constant due to the maximum charge current control of the battery.

Battery voltage*battery charge current=constant regenerated electric power=motor counter-electromotive force*motor current The motor counter-electromotive force is proportional to the speed, and for the motor torque to be proportional to the motor current, this product is constant, and so the motor current is inversely proportional to the speed. For this reason, the group of curves $q_8$ are twin curves that are inversely proportional to the speed. The maximum charge current is variable by the derating depending on battery voltage, i.e. remaining battery charge and temperature, and so the constant regenerated electric power is also proportional to the battery voltage by the previously described expression, and is so expressed by the multiple twin curves.

Also, the quality of the regenerative brake is superior when the total regenerated electric power is larger when stopped less than a constant distance (not a constant time) obtained from a constant speed. In this case, when the vehicle may not be stopped less than a predetermined distance, the mechanical brake is combined to stop as much as possible. If there is no restriction of less than a constant distance, an ineffective light regenerative braking regenerative efficiency results where the vehicle does not quite stop fully in order to prevent mechanical loss from becoming a problem, and so the point of the brake is lost. Therefore, it is preferable to combine the mechanical brake with the brake function to operate by stopping until a point that can be stopped less than a predetermined distance.

The curve $q_{11}$ in FIG. 24 is one example, and the curve $q_{13}$ as illustrated in FIG. 25 may be implemented. The curve $q_{13}$ has the same shape as the curve $q_2$ previously described for low speeds, and as the speed increases, the regenerative brake target torque value becomes constant, and at high speeds, control is performed by the group of lines $q_8$, which are battery charge current control lines. Further, the dotted straight line $q_{12}$ represents a 25% brake line (regenerative efficiency is 75%). At high speeds, in the vicinity when control is performed by the group of lines $q_8$, which are battery charge current control lines, the regenerative brake target torque value falls below this straight line $q_{12}$.

Also, the curve as illustrated in FIG. 26 may be implemented. FIG. 26 illustrates an example when a request brake strength is received from the brake input unit 1028. In this example, when the request brake strength is low, the curve $q_{14}$ is implemented, when the request brake strength is medium, the curve $q_{15}$ is implemented, and when the request brake strength is high, the curve $q_{16}$ is implemented. The curve $q_{16}$ is controlled by one of the group of lines $q_8$, which are battery charge current control lines. In this case, the line runs along the straight line $q_2$ at low speeds, and will not rise above this straight line. Further, curves are not restricted to 3 steps as described here, and may be specified with more than 3 steps or less than 3 steps. Further, the function of the regenerative brake target torque corresponding to the request brake strength may be defined separately.

Figure 27:
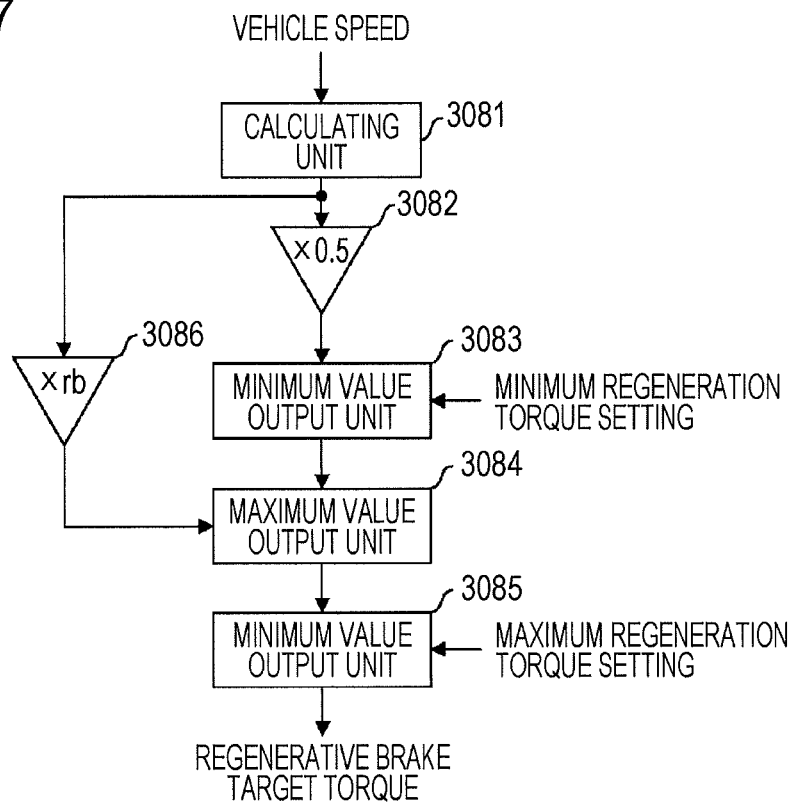
[FIG. 27]

Next, FIG. 27 illustrates a functional block diagram of the regenerative brake target torque calculating unit 1201 for realizing the curve $q_{11}$ illustrated in FIG. 24. The regenerative brake target torque calculating unit 1201 in FIG. 27 includes a conversion unit 3081, a multiplying unit 3086, a multiplying unit 3082, a minimum value output unit 3083, a maximum value output unit 3084, and a minimum value output unit 3085.

The conversion unit 3081 multiplies the current vehicle speed from the vehicle speed input unit 1024 with a previously set conversion coefficient to convert the current vehicle speed into torque. This conversion coefficient is obtained by dividing the conversion coefficient for converting the vehicle speed to a duty cycle (duty cycle divided by the vehicle speed coefficient) by the conversion coefficient for converting torque into a duty cycle (duty cycle divided by the torque coefficient).

Also, the multiplier 3082 multiplies the output value from the conversion unit 3081 by ½. As a result, the points corresponding to the straight line $q_2$ in FIG. 24 are obtained. Also, the minimum value output unit 3083 compares a previously set minimum regeneration torque setting value (group of straight lines $q_6$ in FIG. 24) with a value ½ of the output value from the conversion unit 3081, and outputs the smaller value. Also, the multiplying unit 3086 multiples the output value from the conversion unit 3081 with a previously set medium speed regenerative brake rate setting value rb, and outputs this to the maximum value output unit 3084. The maximum value output unit 3084 compares the output value from the minimum value output unit 3083 and the applicable value from among the straight lines $q_3$ through $q_5$ in FIG. 24, and outputs the larger value. Further, the minimum value output unit 3085 compares the output value from the maximum value output unit 3084 and a previously set maximum regeneration setting value (group of straight lines $q_7$ in FIG. 24), and outputs the smaller value as the regenerative brake target torque value.

In this way, the curve $q_{11}$ as illustrated in FIG. 24 may be realized.

[Fourth Embodiment]

According to the present embodiment, the effect of variance is decreased by not automatically calibrating the conversion coefficient (may also be called the torque-duty cycle coefficient) for calculating the torque duty code from the target torque value.

When a current I flows to a length L in a density of a magnetic flux B, the force F that generates is expressed as F=B*L*I by Fleming's left-hand rule, and a torque T for the vehicle wheel of the bicycle is proportional to this F at a constant rate Kt, and so when the voltage Vt is proportional to the torque duty cycle, and the resistance of the coil R is added, the following expression is established.

$Kt*T=B*L*I=B*L(Vt/R)$ ($Kt$ is a fixed proportional constant)

When adding the torque-duty cycle coefficient Dt, the expression may be modified as below.

$Dt=Vt/T=Kt*R/(B*L)$

The cause of the variance is the length of the coil, resistance, and the density of the magnetic flux. Among these, as the coil is made from copper wiring, depending on the material there are little differences in the resistance of the coil, and so the mechanical dimensions are a cause of variance. The magnetic flux density B is determined by the inverse magnetic force of the magnet and the magnetic track resistance, and so the material of the magnet and the material of the magnetic track can cause a large variance. Also, an electromotive force E that is generated when the conductor of the length L intersects in the magnetic flux density B at the speed v is expressed as E=BLv by Fleming's right-hand rule. That is to say, the electromotive force E is proportional to the counter-electromotive force of the motor, i.e. at a constant rate to the speed duty cycle, and so that the vehicle speed S of the bicycle is proportional to the coil speed v at a constant rate, a voltage Vs which is proportional to the speed duty cycle is added to establish the following expression.

$Vs=Kv*B*L*S$ ($Kv$ is a fixed proportional constant)

When adding a speed-duty cycle coefficient Ds, the expression may be modified as below.

$Ds=Vs/S=Kv*B*L$

The cause of variance is the length of the coil and the magnetic flux density. At this time, the expression for the torque-duty cycle coefficient Dt and the expression for the speed-duty cycle coefficient Ds both share the same B*L, and have inversely proportional relationships and proportional relationships with each other. Thus, when B*L is the cause of variance, Dt and Ds are inversely proportional interlocked, which causes variance.

Thus, with a reference (reference setting) speed-duty cycle coefficient Dss, a calibrated speed-duty cycle coefficient Dsa, a reference (reference setting) torque-duty cycle coefficient Dts, and a corrected Dt as Dta, the following expression is established to obtain an estimated calibrated Dta.

$Dta=Dts*(Dss/Dsa)$

Figure 28:
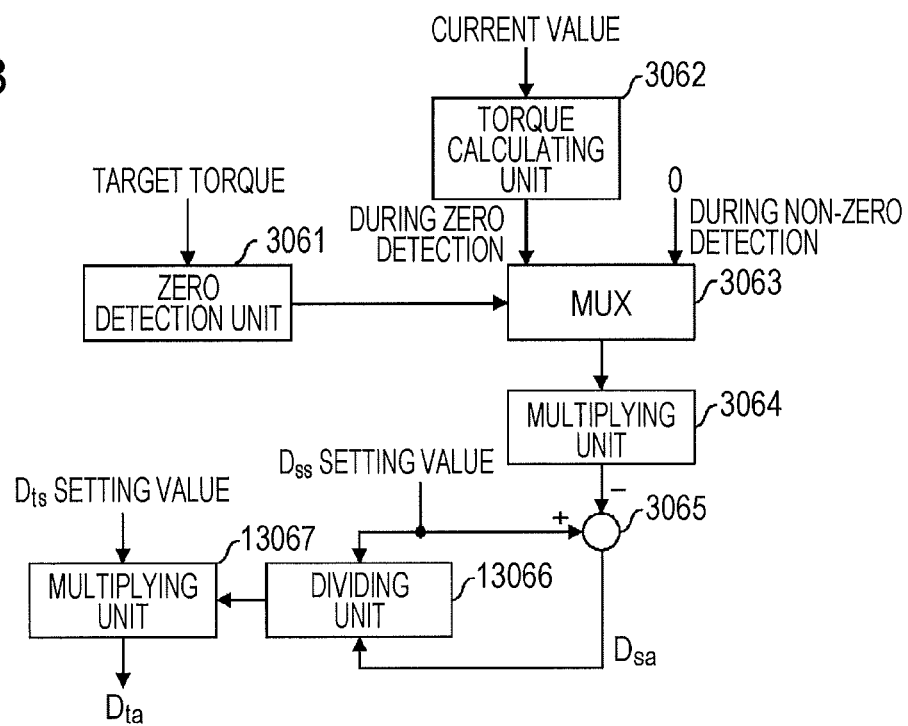
[FIG. 28]

Therefore, the correction unit of the torque-duty cycle coefficient related to the present embodiment as illustrated in the functional block diagram in FIG. 28 includes the zero detection unit 3061, the torque conversion unit 3062, the multiplexor 3063, the integrator 3064, the adding unit 3065, a dividing unit 13066, and a multiplying unit 13067.

The torque conversion unit 3062 multiplies the current value from the current detection unit 1023 with a previously set conversion coefficient (torque divided by current), and outputs the appropriate torque value to the motor drive current. Also, the zero detection unit 3061 determines whether the target torque value is zero, and if a zero has been detected, outputs a detection signal to the multiplexor 3063. The multiplexor 3063 outputs the output value from the torque conversion unit 3062 to the integrator 3064 when the detection signal is output from the zero detection unit 3061, and outputs a zero to the integrator 3064 when no detection signal is output.

The integrator 3064 integrates the output value from the multiplexor 3063 at a predetermined time, and outputs the integration result Dsa to the adding unit 3065. The adding unit 3065 subtracts the output value from the integrator 3064 from the previously set conversion coefficient Dss, and outputs the calculation result to the dividing unit 13066. The dividing unit 13066 executes a calculation to divide the previously set Dss by the calculation result Dsa from the adding unit 3065, and outputs this to the multiplying unit 13067. Also, the multiplying unit 13067 calculates a Dta, which is the product of the previously set Dts and the dividing unit 13066. This Dta is the torque-duty cycle coefficient Dta.

In this way, the effects of variance caused by coil length and magnetic flux density may be reduced.

Figure 29:
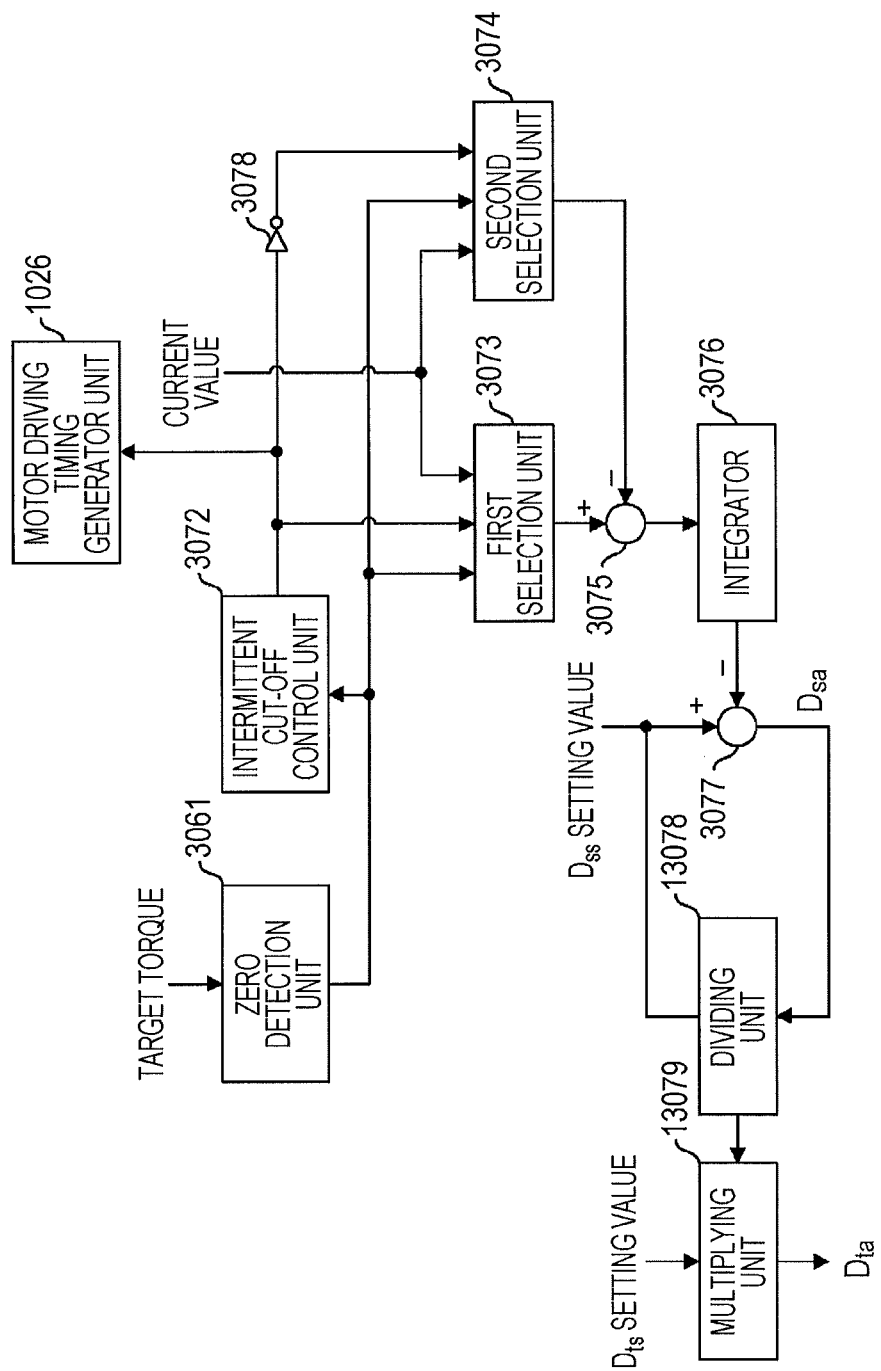
[FIG. 29]

Further, the correction unit of the torque-duty cycle coefficient may also be realized, for example, from the functions as illustrated in the functional block diagram in FIG. 29.

That is to say, the correction unit of the torque-duty cycle coefficient includes the zero detection unit 3061, the intermittent cut-off control unit 3072, the first selection unit 3073, the second selection unit 3074, the adding unit 3075, the integrator 3076, the adding unit 3077, a dividing unit 13078, a multiplying unit 13079, and the inversion unit 3078.

The zero detection unit 3061 determines whether the target torque value is zero, and if a zero is detected, outputs a detection signal to the intermittent cut-off control unit 3072, the first selection unit 3073, and the second selection unit 3074. When the intermittent cut-off control unit 3072 receives the detection signal from the zero detection unit 3061, it intermittently outputs a cut-off signal to the motor drive timing generator unit 1026 to stop the switching of the switches in the FET bridge 1030.

The first selection unit 3073 selects and outputs the current value from the current detection unit 1023 when the detection signal is output from the zero detection unit 3061 and the cut-off signal is output from the intermittent cut-off control unit 3072. In contrast, the second selection unit 3074 selects and outputs the current value from the current detection unit 1023 when the detection signal is output from the zero detection unit 3061 and the cut-off signal is not output from the intermittent cut-off control unit 3072 (that is to say, the inverse unit 3078 turns on the cut-off signal from the intermittent cut-off control unit 3072 when off). Also, The adding unit 3075 subtracts the output value from the second selection unit 3074 from the output value from the first selection unit 3073 to calculate the difference.

In this way, even when some difference occurs with the current detection unit 1023, this effect from the current detection unit 1023 may be cancelled by calculating the difference between the output of the first selection unit 3073 and the second selection unit 3074.

Also, the integrator 3076 integrates the output value from the adding unit 3075 at a predetermined time, and outputs the integration result to the adding unit 3077. The adding unit 3077 subtracts the output value from the integrator 3076 from the previously set conversion coefficient Dss, and outputs the calculation result Dsa to the dividing unit 13078. The dividing unit 13078 executes a calculation to divide the previously set Dss by the calculation result Dsa from the adding unit 3077, and outputs this to the multiplying unit 13079. Also, the multiplying unit 13079 calculates a Dta, which is the product of the previously set Dts and the dividing unit 13078. This Dta is the torque-duty cycle coefficient Dta.

In this way, the effects of variance caused by coil length and magnetic flux density may be reduced.

[Fifth Embodiment]

For example, when the pedal drive wheel (rear wheel in FIG. 8) cannot move due to being locked by a key or similar, and the pedal is depressed, according to the third Embodiment, for example, torque input would be detected by the torque sensor 103, the calculating unit 1021 would perform motor drive corresponding to the input torque. That is to say, as the pedal drive wheel cannot move, a condition arises where the motor drive wheel (front wheel in FIG. 8) idles.

Figure 30:
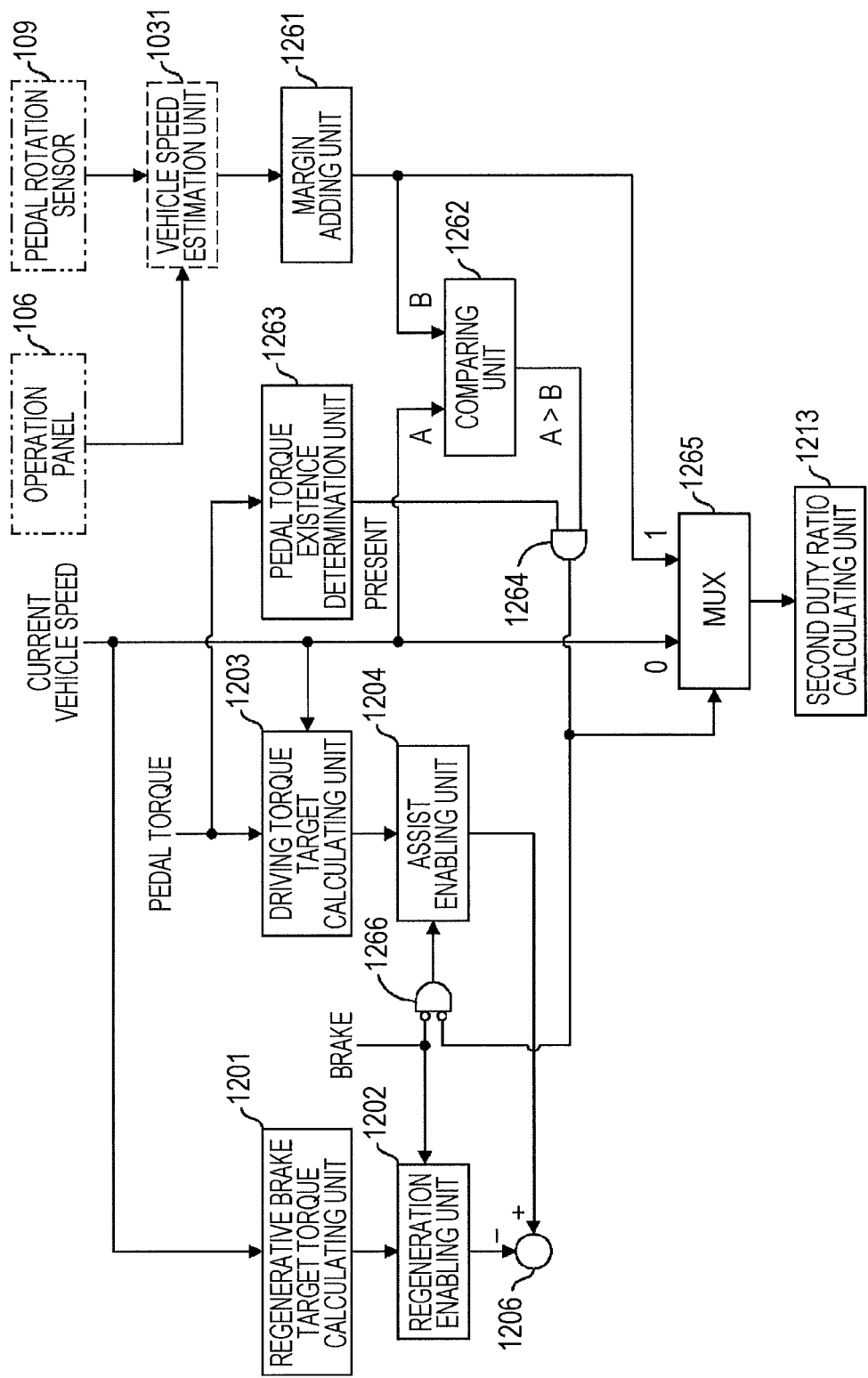
[FIG. 30]

According to the present embodiment, by modifying the third Embodiment such as illustrated in FIG. 30, the previously described condition is prevented. Further, the same configuration elements after the advance correction unit 1207 illustrated in FIG. 11 are used here, and so their illustration is removed, and the configuration and operation of this portion is also the same, and so its description is removed.

According to the present embodiment, in addition to adding a pedal rotation sensor 109, a transmission gear ratio (may also be called a transmission ratio) may be set via, for example, the operation panel 106, and the control mechanism 1020 may obtain a signal representing the gear ratio from the operation panel 106. However, when the signal representing the gear ratio from the operation panel 106 may not be obtained, this may be dealt with as described below.

Also, according to the present embodiment, the control mechanism 1020 also includes a vehicle speed estimating unit 1031. The vehicle speed estimating unit 1031 estimates the vehicle speed for the pedal drive wheel from the pedal rotation frequency obtained from the pedal rotation sensor 109, the gear ratio, and other parameters, and outputs the estimated vehicle speed to the calculating unit 1021.

Also, the calculating unit 1021 includes a margin adding unit 1261, a comparing unit 1262, a pedal torque existence determining unit 1263, a logical multiplying unit 1264, and a multiplexor (MOX) 1265. Further, the calculating unit 1021 in FIG. 11 operates the assist enabling unit 1204 when there is no brake input, and disables the assist enabling unit 1204 when there is brake input. However, according to the present embodiment, when there is no brake input and the output from the logical multiplying unit 1264 is zero (i.e. no slip spinning) (when both inputs from a negative logical input logical multiplying unit 1266 are a negative logical), the assist enabling unit 1204 is operated. Thereupon, in the event that there is no brake input, or the output from the logical multiplying unit 1264 is one, the assist enabling unit 1204 is disabled (controlled to output a zero).

The vehicle speed estimation unit 1031 calculates the estimated vehicle speed, which is the product of the pedal rotation frequency obtained from the pedal rotation sensor 109, the gear ratio obtained from the operation panel 106, and the circumference of the pedal drive wheel, and outputs this to the margin adding unit 1261. Further, when the gear ratio may not be obtained from the operation panel 106 or other, a previously determined maximum gear ratio is used. Further, there are cases in which the maximum gear ratio is one. The margin adding unit 1261 multiplies the estimated vehicle speed with a margin rate, adds a margin to the total, and outputs the estimated vehicle speed with the margin added. The margin rate is, for example, around 1.06, and a tire individual difference margin, a vehicle wheel diameter margin when air pressure is low, a steering angle margin, and so on have been considered for this value. Also, the margin added to the total is, for example, around 1 km/h, and speed in which the pedal rotation frequency may be stably detected has been considered for this value.

The output from the margin adding unit 1261 is input into the comparing unit 1262, and the comparing unit 1262 compares the current speed A from the vehicle speed input unit 1024 with the estimated vehicle speed B with the margin added from the margin adding unit 1261. If A>B during this comparison, that is to say it is determined whether the vehicle speed of the motor drive wheel is greater than the vehicle speed of the pedal drive wheel. The comparing unit 1262 outputs a one to the logical multiplying unit 1264 when the vehicle speed of the motor drive wheel is greater than the vehicle speed of the pedal drive wheel, and outputs a zero to the logical multiplying unit 1264 when vehicle speed of the motor drive wheel is not greater than the vehicle speed of the pedal drive wheel.

In contrast, the pedal torque existence determining unit 1263 determines whether the input torque from the torque sensor 103 is at or over a predetermined threshold. The predetermined threshold is set as an upper limit value equivalent to a zero for the input torque. Also, the pedal torque existence determining unit 1263 outputs a one when the input torque is at or over the predetermined threshold, and outputs a zero when the input torque is less than the predetermined threshold.

The logical multiplying unit 1264 calculates a logical multiplication on the output from the pedal torque existence determining unit 1263 and the output from the comparing unit 1262. Specifically, it outputs a one if the input torque is not zero (at or above the predetermined threshold), and the vehicle speed of the motor drive wheel is greater than the vehicle speed of the pedal drive wheel, and outputs a zero if the input torque is nearly zero (less than the predetermined threshold, and the vehicle speed of the motor drive wheel is not greater than the vehicle speed of the pedal drive wheel. That is to say, a value of one indicates that the motor drive wheel is slip spinning, and a value of zero indicates that the motor drive wheel is not slip spinning.

Therefore, the multiplexor 1265 outputs the output from the margin adding unit 1261 (estimated vehicle speed with the margin added) to the second duty cycle comparing unit 1213, when a one is input from the logical multiplying unit 1264. In contrast, when a zero is input from the logical multiplying unit 1264, the current vehicle speed is output to the second duty cycle comparing unit 1213. That is to say, when the indication is that the motor drive wheel is slip spinning, control is performed based on the vehicle speed estimated from the output from the pedal rotation sensor 109. When the pedal drive wheel is not moving, the estimated vehicle speed of the pedal drive wheel is nearly zero, and so the motor drive is controlled. Also, the assist enabling unit 1204 is disabled (set so that output is zero) when the indication is that the motor drive wheel is slip spinning, and so the motor drive corresponding to the input torque is not performed. In this way, a situation in which the front wheel is slip spinning may be prevented. In this way, the output of the logical multiplying unit 1264 is a control signal that controls the motor drive when the indication is that the motor drive wheel is slip spinning.

Further, the method to add the margin may be changed by combining the vehicle speed estimation unit 1031 and the margin adding unit 1261. For example, instead of multiplying by the gear ratio as with the margin rate, the method may be changed to add the margin by adding the gear ratio. There may be other cases of combinations of other configuration elements.

Further, as previously described, a determination is performed in which a relation generally holds where the current vehicle speed is greater than the product of the pedal rotation frequency, the pedal drive wheel circumference, and the gear ratio. Therefore, when the gear ratio is larger than the maximum gear ratio as calculated by (gear ratio=current speed/(pedal rotation frequency*the pedal drive wheel circumference)), and the same signal may be output as when the comparing unit 1262 determines that A is greater than B. Also, the determination may be made with a calculation such as (current vehicle speed/(pedal rotation frequency*the pedal drive wheel circumference*the gear ratio)(=index value)>1). Other modifications using different index values may be used.

Figure 31:
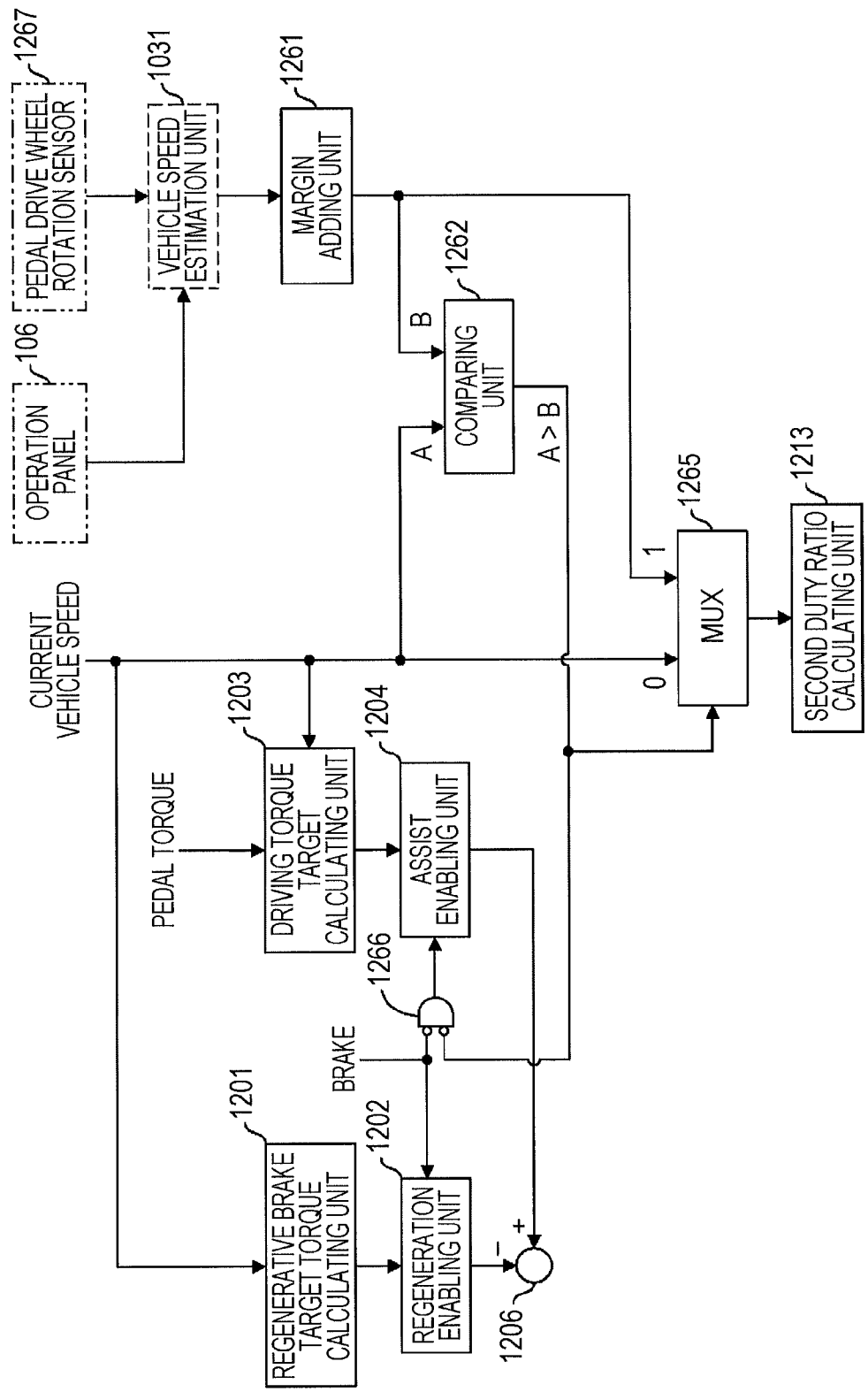
[FIG. 31]

Also, when the pedal drive wheel rotation number is obtained directly, the pedal drive wheel rotation number may be used instead of the pedal rotation number. For example, as illustrated in FIG. 31, a pedal drive wheel rotation sensor 1267 is implemented instead of the pedal rotation sensor 109. In this case, the pedal drive wheel rotation number is directly detected, and so the lock and unlock state of the free wheel that intervenes in power transmission path between the pedal and the pedal drive wheel does not have to be considered. Therefore, the pedal torque existence determination unit 1263 and the logical multiplying unit 1264 used in a case as illustrated in FIG. 30 are no longer needed, and the output from the comparing unit 1262 is directly supplied to the multiplexor 1265 and the negative logical input logical multiplying unit 1266. Further, the pedal drive wheel rotation sensor 1267 is provisioned to the rear wheel axis, if the electrically assisted bicycle 1 is rear wheel drive, as in FIG. 8.

Further, according to the present embodiment, when peddling a bicycle that is not moving much, and too much torque may be placed on the pedal, this has an advantage from a safety perspective by controlling the motor drive.

The present invention has been described with the embodiments, but the present invention is not limited to only these embodiments. Specific calculation methods to realize the functions previously described are many in number, and any of these may be implemented.

Also, a portion of the calculating unit 1021 may be realized with a specialized circuit, and the functions described previously may also be realized by executing a program with a microprocessor.

What is claimed is:

1. A motor drive control apparatus, comprising:
   a speed processing unit configured to generate a first value by converting a second value corresponding to a current speed;
   a torque processing unit configured to generate a third value by converting a fourth value corresponding to a target torque; and
   a drive unit configured to control switching by a switch included in a complementary switching amplifier by an average duty ratio corresponding to a sum of the first value and the third value to drive a motor connected to the complementary switching amplifier.

2. The motor drive control apparatus according to claim 1, further comprising:
   a calibrating unit configured to calibrate the fourth value so as to reduce a drive current of the motor according to a deviation of a fifth value that is obtained by converting a sixth value corresponding to the drive current into torque, when the fifth value deviates from the fourth value by a predetermined permissible amount or more.

3. The motor drive control apparatus according to claim 1, wherein the drive unit is configured to correct the sum of the first value and the third value according to power supply voltage.

4. The motor drive control apparatus according to claim 1, further comprising:
a timing correction unit configured to generate a signal for phase control of a signal for the switching from the second value and the fourth value.

5. The motor drive control apparatus according to claim 1, wherein the torque processing unit is configured to correct the fourth value according to the second value.

6. The motor drive control apparatus according to claim 1, wherein the torque processing unit includes a torque restriction unit configured to put restrictions on a range of the fourth value based on a current restriction corresponding to the average duty ratio and a power supply voltage.

7. The motor drive control apparatus according to claim 6, wherein, when a power supply is a rechargeable battery, a current restriction corresponding to the power supply voltage is set according to full charge surplus or remaining charge surplus of the rechargeable battery.

8. The motor drive control apparatus according to claim 6, wherein the torque restriction unit is configured to put restrictions on the range of the fourth value, further based on a current restriction that is based on a temperature of the switch.

9. The motor drive control apparatus according to claim 1, further comprising:
a speed prediction unit configured to predict the current speed from plural past speed detection results.

10. The motor drive control apparatus according to claim 1, wherein the torque processing unit is configured to identify a corresponding fourth value from a current second value according to a predetermined correspondence between the second value and the corresponding fourth value in response to a brake instruction, and according to the predetermined correspondence, the third value becomes a value opposite in polarity to the first value.

11. The motor drive control apparatus according to claim 10, wherein the predetermined correspondence is a correspondence by which an absolute value of the third value becomes a value that is equal to or less than a half of an absolute value of the first value.

12. The motor drive control apparatus according to claim 11, wherein the brake instruction includes an instruction concerning a brake amount, and the predetermined correspondence includes different correspondences depending on the brake amount.

13. The motor drive control apparatus according to claim 10, wherein the predetermined correspondence includes a portion in which, as an absolute value of the second value becomes greater, an absolute value of the fourth value becomes lesser.

14. The motor drive control apparatus according to claim 10, wherein the predetermined correspondence includes a portion of a correspondence determined by current restriction determined according to a power supply voltage.

15. The motor drive control apparatus according claim 1, further comprising:
a calibrating unit configured to calibrate a conversion coefficient or a conversion function in the speed processing unit so that a drive current of the motor becomes zero when the fourth value is zero.

16. The motor drive control apparatus according to claim 15, wherein the calibrating unit is configured to calibrate the conversion coefficient or the conversion function in the speed processing unit so that a difference between a drive current value during stop of motor drive and a drive current value during non-stop of the motor drive becomes zero when a state is detected in which the fourth value is zero.

17. The motor drive control apparatus according to claim 1, further comprising:
a vehicle speed estimation unit configured to estimate a vehicle speed regarding a pedal-driven wheel from a rotation frequency of a pedal, wherein the current speed is a vehicle speed regarding a motor-driven wheel;
a comparator configured to compare the current speed with the vehicle speed regarding the pedal-driven wheel; and
a control signal output unit configured to output a control signal for suppressing motor drive when the comparison result from the comparator represents that the current speed is faster than the vehicle speed regarding the pedal-driven wheel, and an input torque from the pedal is equal to or greater than a threshold.

18. The motor drive control apparatus according to claim 17, further comprising:
a unit configured to set the target torque to zero by the control signal.

19. The motor drive control apparatus according to claim 17, further comprising:
a unit configured to cause the speed processing unit to process the vehicle speed regarding the pedal-driven wheel estimated by the vehicle speed estimating unit instead of the current speed.

20. The motor drive control apparatus according to claim 17, wherein the vehicle speed estimating unit is configured to estimate the vehicle speed regarding the pedal-driven wheel based on a product of the rotation frequency of the pedal, the circumference of the pedal-driven wheel, and a gear ratio of a transmission.

21. The motor drive control apparatus according to claim 1, further comprising:
a unit configured to calculate an indicator value for determining whether slip of the motor-driven wheel occurs, by using the current speed, a rotation frequency of a pedal and a circumference of a pedal-driven wheel, and determine whether the slip of the motor-driven wheel occurs, based on the indicator value when an input torque by the pedal is equal to or greater than a threshold; and
a control signal output unit configured to output a control signal for suppressing motor drive when it was determined that the slip of the motor-driven wheel occurred.

22. The motor drive control apparatus according to claim 1, further comprising:
a vehicle speed estimating unit configured to estimate a vehicle speed regarding a pedal-driven wheel from a rotation frequency of the pedal-driven wheel, wherein the current speed is a vehicle speed regarding a motor-driven wheel;
a comparator configured to compare the current speed with the vehicle speed regarding the pedal-driven wheel; and
a control signal output configured to output a control signal for suppressing motor drive when a comparison result from the comparator represents that the current speed is faster than the vehicle speed regarding the pedal-driven wheel.

23. A motor drive control apparatus, comprising:
a speed processing unit configured to generate a first value by converting a second value corresponding to a current speed;

a torque processing unit configured to generate a third value by converting a fourth value corresponding to a target torque;

a drive unit configured to control switching by a switch included in a complementary switching amplifier by an average duty ratio corresponding to a sum of the first value and the third value to drive a motor connected to the complementary switching amplifier; and a calibrating unit configured to calibrate a second conversion coefficient in the torque processing unit based on a reference value of a first conversion coefficient in the speed processing unit, a value of the first conversion coefficient, which is calibrated so that a motor drive current becomes zero when the fourth value is zero, and a reference value of the second conversion coefficient.

* * * * *